United States Patent
Åhlander et al.

(10) Patent No.: US 11,115,979 B2
(45) Date of Patent: Sep. 7, 2021

(54) OPTIMIZING NETWORK DEMODULATION PERFORMANCES BY SIGNALING SUPPORTED UE TRANSIENT TIME

(71) Applicant: Telefonaktiebolaget LM Ericsson (publ), Stockholm (SE)

(72) Inventors: Mats Åhlander, Täby (SE); Dominique Everaere, Åkersberga (SE); Laetitia Falconetti, Järfälla (SE); Muhammad Kazmi, Sundbyberg (SE); Imadur Rahman, Sollentuna (SE); Mårten Sundberg, Årsta (SE)

(73) Assignee: Telefonaktiebolaget LM Ericsson (Publ) Stockholm, Sweden, Stockholm (SE)

( * ) Notice: Subject to any disclaimer, the term of this patent is extended or adjusted under 35 U.S.C. 154(b) by 99 days.

(21) Appl. No.: 16/493,223

(22) PCT Filed: Mar. 23, 2018

(86) PCT No.: PCT/SE2018/050301
§ 371 (c)(1),
(2) Date: Sep. 11, 2019

(87) PCT Pub. No.: WO2018/174802
PCT Pub. Date: Sep. 27, 2018

(65) Prior Publication Data
US 2021/0136754 A1    May 6, 2021

Related U.S. Application Data

(60) Provisional application No. 62/476,257, filed on Mar. 24, 2017.

(51) Int. Cl.
*H04W 72/10* (2009.01)
*H04L 5/00* (2006.01)
(Continued)

(52) U.S. Cl.
CPC ....... *H04W 72/0446* (2013.01); *H04L 5/0053* (2013.01); *H04W 52/0216* (2013.01)

(58) Field of Classification Search
CPC ......... H04W 72/0446; H04W 52/0216; H04W 72/10; H04L 5/0053; H04L 5/0078; H04L 5/0048; H04L 5/005
See application file for complete search history.

(56) References Cited

U.S. PATENT DOCUMENTS 4,965,821 A * 10/1990 Bishop ................ G07F 17/0042
455/408
5,625,573 A * 4/1997 Kim ..................... H04L 27/2332
375/344
(Continued)

FOREIGN PATENT DOCUMENTS

EP    3 439 378 A2    5/2017
EP    3 454 610 A1    3/2019
(Continued)

OTHER PUBLICATIONS

3GPP TSG RAN WG1 Meeting #86bis; Lisbon, Portugal; Source: CATT; Title: Discussion on UL sTTI operation (R1-1608749)—Oct. 10-14, 2016.
(Continued)

*Primary Examiner* — Diane L Lo
*Assistant Examiner* — Abusayeed M Haque
(74) *Attorney, Agent, or Firm* — Christopher & Weisberg, P.A.

(57) ABSTRACT

A method in a first node (610, 615) is disclosed. The method comprises determining (704) a time resource over which the first node transmits a signal to a second node (610, 615). The method comprises signaling (708), to at least one of the second node or a third node (610, 615), information about one or more transient time parameters associated with the time resource, wherein the one or more transient time
(Continued)

parameters are used by the first node for transmitting the signal to the second node during the time resource. The method comprises adapting (712) a transmitter configuration of the first node for transmitting the signal to the second node based on one of the one or more transient time parameters.

24 Claims, 14 Drawing Sheets

(51) Int. Cl.
*H04W 72/04* (2009.01)
*H04W 52/02* (2009.01)

(56) References Cited

U.S. PATENT DOCUMENTS

| | | | | |
|---|---|---|---|---|
| 2010/0002857 | A1* | 1/2010 | Openiano | G01D 4/004 |
| | | | | 379/106.03 |
| 2011/0171979 | A1* | 7/2011 | Rune | H04W 24/02 |
| | | | | 455/458 |
| 2013/0243119 | A1* | 9/2013 | Dalipi | H03F 1/3241 |
| | | | | 375/296 |
| 2015/0029890 | A1* | 1/2015 | Siomina | H04L 1/1887 |
| | | | | 370/252 |
| 2016/0286574 | A1* | 9/2016 | Abraham | H04L 63/04 |
| 2018/0035409 | A1* | 2/2018 | Chmiel | H04L 1/1835 |
| 2018/0049228 | A1 | 2/2018 | Lee et al. | |
| 2018/0323848 | A1* | 11/2018 | Mizusawa | H04W 16/28 |

FOREIGN PATENT DOCUMENTS

| | | |
|---|---|---|
| WO | 2016 133123 A1 | 8/2016 |
| WO | 2017 209562 A1 | 12/2017 |
| WO | 2018 083652 A1 | 5/2018 |

OTHER PUBLICATIONS

3GPP TSG-RAN WG4 Meeting #81; Reno, Nevada; Source: Huawei, Hisilicon; Title: Discussion on UL On/Off time mask (R4-1609383)—Nov. 14-18, 2016.
3GPP TSG-RAN WG1 Meeting #82bis; Spokane, Washington; Source: Ericsson; Title: Performance implication of UL On/Off time mask on sTTI operation (R1-1703840)—Apr. 3-7, 2017.
3GPP TSG-RAN WG4 Meeting #83; Hangzhou, China; Source: Ericsson; Title: UE reporting supported transient time parameters (R4-1704841)—May 15-19, 2017.
PCT International Search Report for International application No. PCT/SE2018/050301—dated Aug. 3, 2018.
PCT Written Opinion of the International Searching Authority for International application No. PCT/SE2018/050301—dated Aug. 3, 2018.
Extended European Search Report issued for Application No. / Patent No. 18771764.0-1205 / 3603244 PCT/SE2018050301—dated Dec. 4, 2020.

* cited by examiner

OPTIMIZING NETWORK DEMODULATION PERFORMANCES BY SIGNALING SUPPORTED UE TRANSIENT TIME

PRIORITY

This nonprovisional application is a U.S. National Stage Filing under 35 U.S.C. § 371 of International Patent Application Serial No. PCT/SE2018/050301 filed Mar. 23, 2018 and entitled "OPTIMIZING NETWORK DEMODULATION PERFORMANCES BY SIGNALING SUPPORTED UE TRANSIENT TIME" which claims priority to U.S. Provisional Patent Application No. 62/476,257 filed Mar. 24, 2017 both of which are hereby incorporated by reference in their entirety.

TECHNICAL FIELD

The present disclosure relates, in general, to wireless communications, and more particularly to optimizing network demodulation performances by signaling supported user equipment (UE) transient time.

BACKGROUND

Long Term Evolution (LTE) uses Orthogonal Frequency Division Multiplexing (OFDM) in the downlink (DL) and Discrete Fourier Transform (DFT)-spread OFDM in the uplink (UL).

FIG. 1 illustrates an example of the LTE time-domain structure. In the time domain, LTE DL transmissions are organized into radio frames (such as radio frame 10) of 10 milliseconds (ms). Each radio frame 10 consists of ten equally-sized subframes of length $T_{subframe}=1$ ms, as shown in FIG. 1. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

The resource allocation in LTE is typically described in terms of resource blocks, where a resource block corresponds to one slot (0.5 ms) in the time domain and 12 contiguous subcarriers in the frequency domain. A pair of two adjacent resource blocks in the time direction (i.e., 1.0 ms) is known as a resource block pair. This is also denoted as Transmission Time Interval (TTI).

DL transmissions are dynamically scheduled (i.e., in each subframe the base station transmits control information about which terminals data is transmitted to and upon which resource blocks the data is transmitted, in the current DL subframe). This control signaling is typically transmitted in the first 1, 2, 3 or 4 OFDM symbols in each subframe and the number n=1, 2, 3 or 4 is known as the Control Format Indicator (CFI) indicated by the Physical CFI Channel (PCFICH) transmitted in the first symbol of the control region. The control region also contains Physical Downlink Control Channels (PDCCHs) and possibly also Physical Hybrid Automatic Repeat Request (HARQ) Indication Channels (PHICHs) carrying Acknowledgement (ACK)/Negative Acknowledgement (NACK) for the UL transmission.

The DL subframe also contains common reference symbols (CRS), which are known to the receiver and used for coherent demodulation of, for example, the control information.

FIG. 2 illustrates an example downlink subframe 20A. More particularly, FIG. 2 illustrates an example DL system with CFI=3 OFDM symbols as control. In an LTE Release 8 TTI, one such portion of the DL transmission is referred to as one TTI.

Packet data latency is one of the performance metrics that vendors, operators and also end-users (e.g., via speed-test applications) regularly measure. Latency measurements are done in all phases of a Radio Access Network (RAN) system lifetime (e.g., when verifying a new software release or system component, when deploying a system, and when the system is in commercial operation).

Shorter latency than previous generations of $3^{rd}$ Generation Partnership Project (3GPP) Radio Access Technologies (RATs) was one performance metric that guided the design of LTE. LTE is now recognized by end-users to be a system that provides faster access to the Internet and lower data latencies than previous generations of mobile radio technologies.

Packet data latency is important not only for the perceived responsiveness of the system; it is also a parameter that indirectly influences the throughput of the system. Hypertext Transfer Protocol (HTTP)/Transmission Control Protocol (TCP) is the dominating application and transport layer protocol suite used on the Internet today. The typical size of HTTP-based transactions over the Internet are in the range of a few 10 s of kilobytes up to 1 megabyte. In this size range, the TCP slow-start period is a significant part of the total transport period of the packet stream. During the TCP slow-start period, the performance is latency limited. Hence, improved latency can rather easily be shown to improve the average throughput for this type of TCP-based data transaction.

Radio resource efficiency could be positively impacted by latency reductions. Lower packet data latency could increase the number of transmissions that are possible within a certain delay bound. Hence, higher Block Error Rate (BLER) targets could be used for the data transmissions, freeing up radio resources and potentially improving the capacity of the system.

One area to address when it comes to packet latency reductions is the reduction of transport time of data and control signaling, by addressing the length of a TTI. In LTE Release 8, a TTI corresponds to one subframe of length 1 ms. One such 1 ms TTI is constructed by using 14 OFDM or Single Carrier-Frequency Division Multiple Access (SC-FDMA) symbols in the case of normal cyclic prefix (CP) and 12 OFDM or SC-FDMA symbols in the case of extended cyclic prefix (CP). In LTE Release 13, a work item with the goal of specifying transmissions with shorter TTIs that are much shorter than the LTE Release 8 TTI is ongoing. The shorter TTIs can be decided to have any duration in time and comprise resources on a number of OFDM or SC-FDMA symbols within a 1 ms subframe. As one example, the duration of the short TTI (sTTI) may be 0.5 ms (i.e., seven OFDM or SC-FDMA symbols for the case with normal cyclic prefix). As another example, the duration of the sTTI may be 2 symbols.

As seen in FIG. 2, the TTI length consists of 14 OFDM symbols. With shortened TTIs, the TTI length can be reduced to 2-OFDM symbols or 7-OFDM symbols. These are denoted as: 2-OS sTTI and 7-OS sTTI, respectively. As used herein, the OS can also be SC-FDMA or any type of symbol.

The shortened TTI can be used in different values in different direction, such as DL and UL. For example: a DL in a cell can use 2-OS sTTI, while an UL in the same cell can use 7-OS sTTI.

For different frame structures, such as FS1, FS2 and FS3, the sTTI that is used could be different too. The time domain structure described above in relation to FIG. 1 relates to FS1. For FS1, 2-OS and 7-OS TTI can be used. For FS2 (which is used for Time Division Duplex (TDD)), 7-OS sTTI is one of the shortened TTI modes. Some example TTI durations are described below in relation to FIG. 3.

FIG. 3 illustrates an example of a 7-symbol sTTI in DL. As can be seen from FIG. 3, subframe 20B is divided into two sTTIs 30A and 30B (also denoted in the example of FIG. 3 as TTI #0 and TTI #1, respectively). Each sTTI 30A and 30B consists of 7 symbols 32 (e.g., OFDM or SC-FDMA symbols). More particularly, sTTI 30A consists of symbols 32A-G and sTTI 30B consists of symbols 32H-N. In the example of FIG. 3, symbol 32D and 32K contain reference signals (Denoted by the notation "RS" in FIG. 3).

For 7-symbol sTTI, the sTTI structure in the example of FIG. 3 is supported for UL according to agreements in R1-1611055, 3GPP TSG-RAN WG1#86 bis, Lisbon, Portugal 10-14 Oct. 2016, entitled "LS on Shortened TTI and processing time for LTE" (hereinafter "R1-1611055").

From the UL sTTI point of view, the following is observed. First, there are two different TTI lengths that are possible for UL. For each length there is a fixed TTI pattern used. A TTI in this context corresponds to the data symbols transmitted, while the associated Demodulation Reference Signal (DMRS) can be placed within, before or after the TTI. Second, the UL sTTI can be combined with a DL sTTI not being the same as the UL sTTI. Combinations supported in {DL, UL} are: {2,2}, {7,7} and {2,7} for Frequency Division Duplex (FDD) operation. In TDD, only {7,7} is supported. Third, dynamic indication of DMRS position in fast UL grant is also supported. Fourth, for some of the TTI patterns, shared DMRS is possible between UEs. For some UEs, this also means that they will need to send DMRS for two TTIs when the UE is scheduled across neighboring TTIs.

As stated in 3GPP TS 36.101, v14.1.0, Section 6.3.4, "[t]he General ON/OFF time mask defines the observation period between Transmit OFF and ON power and between Transmit ON and OFF power. ON/OFF scenarios include; the beginning or end of DTX, measurement gap, contiguous, and non contiguous transmission. The OFF power measurement period is defined in a duration of at least one sub-frame excluding any transient periods. The ON power is defined as the mean power over one sub-frame excluding any transient period. There are no additional requirements on UE transmit power beyond that which is required in subclause 6.2.2 and subclause 6.6.2.3."

FIG. 4 illustrates an example of the general ON/OFF time mask. More particularly, FIG. 4 is reproduced from 3GPP TS 36.101, v14.1.0, FIG. 6.3.4.1-1. The ON/OFF time mask of FIG. 4 is designed for 1 ms TTI in Release 8 legacy LTE systems. The duration of ramping of power (e.g., the ramping up of power during the 20 μs transient period from the end of OFF power requirement to the start of ON power or the ramping down of power during the 20 μs transient period from the end of ON power to the start of OFF power requirement) in the mask is shorter compared to the length of subframe or slot, but its position has an influence on system performance. In terms of ramping up/down or transient position, a few non-limiting possibilities include: ramping outside timeslot/subframe; ramping inside timeslot/ subframe; and ramping partly inside and outside timeslot/ subframe. Examples of these approaches to ramping up/down are illustrated in FIG. 5 described below.

FIG. 5 illustrates examples of the different possibilities for location of the power ramps. More particularly, FIG. 5 illustrates three examples 5-(A), 5-(B), and 5-(C) of ramping up and down of power in different possible locations in time in the mask. In example 5-(A), ramping up and down of power takes place outside subframe 20C. In example 5-(B), ramping up and down of power takes place inside subframe 20D. In example 5-(C), ramping up and down of power takes place partially inside and partially outside subframe 20E.

In the current specifications, the transient period for ON/OFF mask with 1 ms TTI duration is defined as 20 μs, which is quite small compared to 1 ms TTI duration. However, a shorter TTI length (as short as 2-OS sTTI compared to 14-OS (i.e., 1 ms)) may mean that the transient period can become quite significant compared to TTI duration. For example, for 2-OS TTI duration a 20 μs transient period will be roughly $\frac{1}{7}^{th}$ of the TTI duration, which will reduce the system performance significantly.

SUMMARY

To address the foregoing problems with existing solutions, disclosed is a method in a first node. The method comprises determining a time resource over which the first node transmits a signal to a second node. The method comprises signaling, to at least one of the second node or a third node, information about one or more transient time parameters associated with the time resource, wherein the one or more transient time parameters are used by the first node for transmitting the signal to the second node during the time resource. The method comprises adapting a transmitter configuration of the first node for transmitting the signal to the second node based on one of the one or more transient time parameters.

In certain embodiments, the first node may be a wireless device and the second node may be a network node. In certain embodiments, the first node may be a network node and the second node may be a wireless device.

In certain embodiments, adapting the transmitter configuration of the first node for transmitting the signal to the second node based on one of the one or more transient time parameters may comprise one or more of: adapting the transmitter configuration such that an ON/OFF behavior of the first network node in the time resource meets one or more pre-defined requirements; and adapting the transmitter configuration such that the signal is transmitted according to one of the one or more transient time parameters. In certain embodiments, the method may comprise transmitting the signal to the second node using the adapted transmitter configuration.

In certain embodiments, determining the time resource over which the first node transmits the signal to the second node may comprise one or more of: determining the time resource based on one or more pre-defined rules; and receiving the time resource from another node. In certain embodiments, determining the time resource over which the first node transmits the signal to the second node may be based on one or more of: pre-defined information; a configuration received from another node; and one or more transmission time intervals supported by the first node.

In certain embodiments, the one or more transient time parameters may consist of a single transient time parameter associated with the time resource.

In certain embodiments, the one or more transient time parameters may comprise at least two transient time parameters associated with the time resource. The method may comprise receiving, from at least one of the second node and the third node, a configuration requesting the first node to apply one of the at least two transient time parameters for transmitting the signal to the second node.

In certain embodiments, the one or more transient time parameters may define at least a time period between any two points in time over which the first node changes its transmit power. In certain embodiments, the method may comprise determining the one or more transient time parameters associated with the time resource based on one or more of: a duration of the time resource; a numerology of the signal to be transmitted by the first node; a type of signal to be transmitted by the first node in the time resource; a frequency band of the signal to be transmitted by the first node; a radio frequency filter implementation in the first node; and an amount of available resources in the first node for transmitting signals.

In certain embodiments, the information about the one or more transient time parameters may comprise one or more of: a duration of a corresponding transient time; an identifier of one of a plurality of transient times associated with the time resource; and an identifier of the time resource associated with the one or more transient time parameters.

In certain embodiments, the information about the one or more transient time parameters may be signaled in response to a request.

Also disclosed is a first node. The first node comprises a receiver, a transmitter, and processing circuitry coupled to the receiver and the transmitter. The processing circuitry and/or first node is configured to determine a time resource over which the first node transmits a signal to a second node. The processing circuitry and/or first node is configured to signal, via the transmitter, to at least one of the second node or a third node, information about one or more transient time parameters associated with the time resource, wherein the one or more transient time parameters are used by the first node for transmitting the signal to the second node during the time resource. The processing circuitry and/or first node is configured to adapt a transmitter configuration of the first node for transmitting the signal to the second node based on one of the one or more transient time parameters.

Also disclosed is a first node. The first node comprises a receiving module, a communication module, and a determining module coupled to the receiving module and the transmitting module. The determining module is configured to determine a time resource over which the first node transmits a signal to a second node. The communication module is configured to signal, to at least one of the second node or a third node, information about one or more transient time parameters associated with the time resource, wherein the one or more transient time parameters are used by the first node for transmitting the signal to the second node during the time resource. The determining module is configured to adapt a transmitter configuration of the first node for transmitting the signal to the second node based on one of the one or more transient time parameters.

Also disclosed is a computer program, the computer program comprising instructions configured to perform the above-described method in a first node. Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a first node.

Also disclosed is a method in a second node. The method comprises receiving, from one or more of a first node and a third node, information about at least one transient time parameter supported by the first node for transmitting a signal over a time resource to the second node. The method comprises receiving, from the first node, the signal over the time resource based on the at least one transient time parameter.

In certain embodiments, the information about the at least one transient time parameter may be received in response to a request sent by the second node.

In certain embodiments, receiving information about the at least one transient time parameter may comprise receiving information about a plurality of transient time parameters supported by the first node for transmitting the signal over the time resource to the second node.

In certain embodiments, the method may comprise selecting one of the plurality of transient time parameters with which to configure the first node, and configuring the first node with the selected one of the plurality of transient time parameters. In certain embodiments, the selection may be based on at least one of: a receiver capability of the second node; and a transport format of the signal transmitted by the first node.

In certain embodiments, the method may comprise adapting a receiver configuration of the second node based on the selected one of the plurality of transient time parameters. In certain embodiments, adapting the receiver configuration may comprise demodulating the received signal using the selected transient time parameter by removing one or more signal samples received from the first node during a transient time period associated with the selected one of the plurality of transient time parameters.

In certain embodiments, the first node may be a wireless device and the second node may be a network node. In certain embodiments, the first node may be a network node and the second node may be a wireless device.

In certain embodiments, the information about the one or more transient time parameters may comprise one or more of: a duration of a corresponding transient time; an identifier of one of a plurality of transient times associated with the time resource; and an identifier of the time resource associated with the one or more transient time parameters.

Also disclosed is a second node. The second node comprises a receiver, a transmitter, and processing circuitry coupled to the receiver and the transmitter. The processing circuitry and/or second node is configured to receive, via the receiver from one or more of a first node and a third node, information about at least one transient time parameter supported by the first node for transmitting a signal over a time resource to the second node. The processing circuitry and/or second node is configured to receive, via the receiver from the first node, the signal over the time resource based on the at least one transient time parameter.

Also disclosed is a second node. The second node comprises a receiving module, a communication module, and a determining module coupled to the receiving module and the communication module. The receiving module is configured to receive, from one or more of a first node and a third node, information about at least one transient time parameter supported by the first node for transmitting a signal over a time resource to the second node. The receiving module is configured to receive, via the receiver from the first node, the signal over the time resource based on the at least one transient time parameter.

Also disclosed is a computer program, the computer program comprising instructions configured to perform the above-described method in a second node. Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a second node.

Also disclosed is a method in a third node. The method comprises receiving, from a first node, information about at least one transient time parameter supported by the first node for transmitting a signal over a time resource to a second node. The method comprises transmitting the received information about the at least one transient time parameter to the second node.

In certain embodiments, the information about the at least one transient time parameter may comprise one or more of: a duration of a corresponding transient time; an identifier of one of a plurality of transient times associated with the time resource; and an identifier of the time resource associated with the one or more transient time parameters.

Also disclosed is a third node. The third node comprises a receiver, a transmitter, and processing circuitry coupled to the receiver and the transmitter. The processing circuitry and/or third node is configured to receive, via the receiver from a first node, information about at least one transient time parameter supported by the first node for transmitting a signal over a time resource to a second node. The processing circuitry and/or third node is configured to transmit, via the transmitter, the received information about the at least one transient time parameter to the second node.

Also disclosed is a third node. The third node comprises a receiving module, a communication module, and a determining module coupled to the receiving module and the communication module. The receiving module is configured to receive, from a first node, information about at least one transient time parameter supported by the first node for transmitting a signal over a time resource to a second node. The communication module is configured to transmit the received information about the at least one transient time parameter to the second node.

Also disclosed is a computer program, the computer program comprising instructions configured to perform the above-described method in a third node. Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a third node.

Certain embodiments of the present disclosure may provide one or more technical advantages. As one example, certain embodiments may advantageously optimize demodulation performance (e.g., in a network node). As another example, certain embodiments may advantageously enable better wireless device transient time, and thus better system performances. As another example, certain embodiments may advantageously relax the wireless device transient time requirement per TTI to guaranty strict minimum performances, thereby enabling performance improvements. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
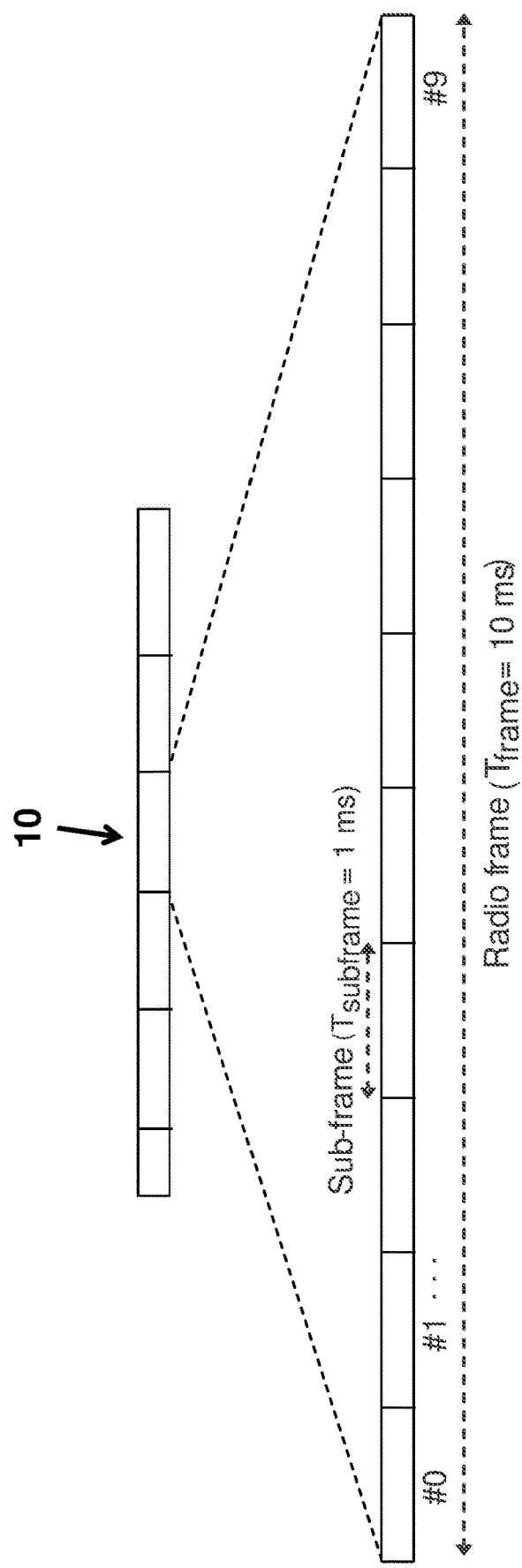
FIG. 1 illustrates an example of the LTE time-domain structure.
Figure 2:
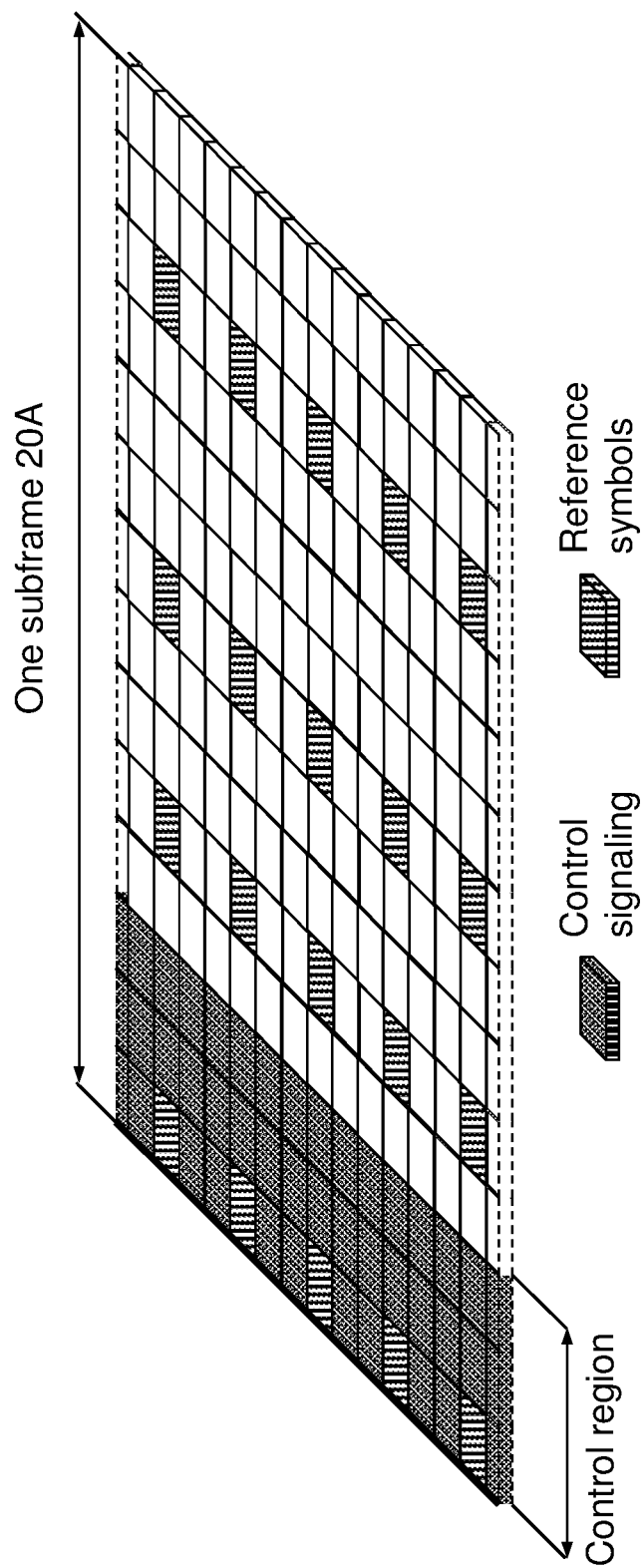
FIG. 2 illustrates an example downlink subframe.
Figure 3:
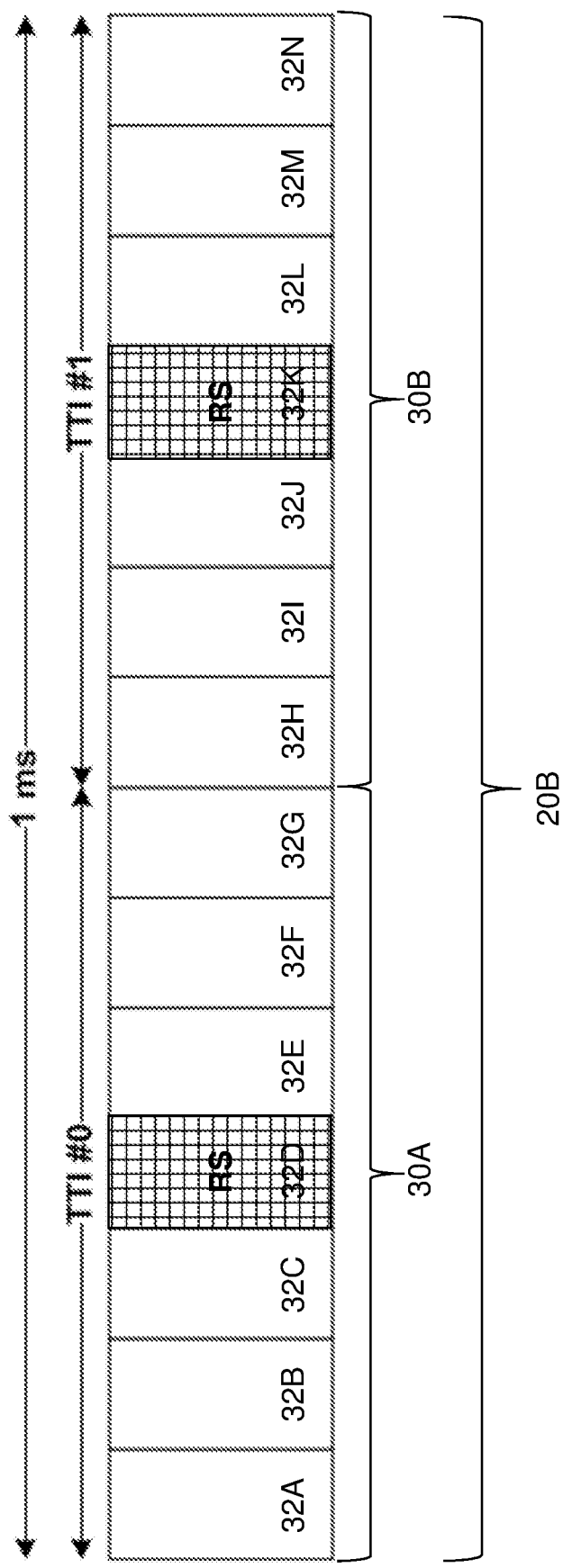
FIG. 3 illustrates an example of a 7-symbol sTTI in DL.
Figure 4:
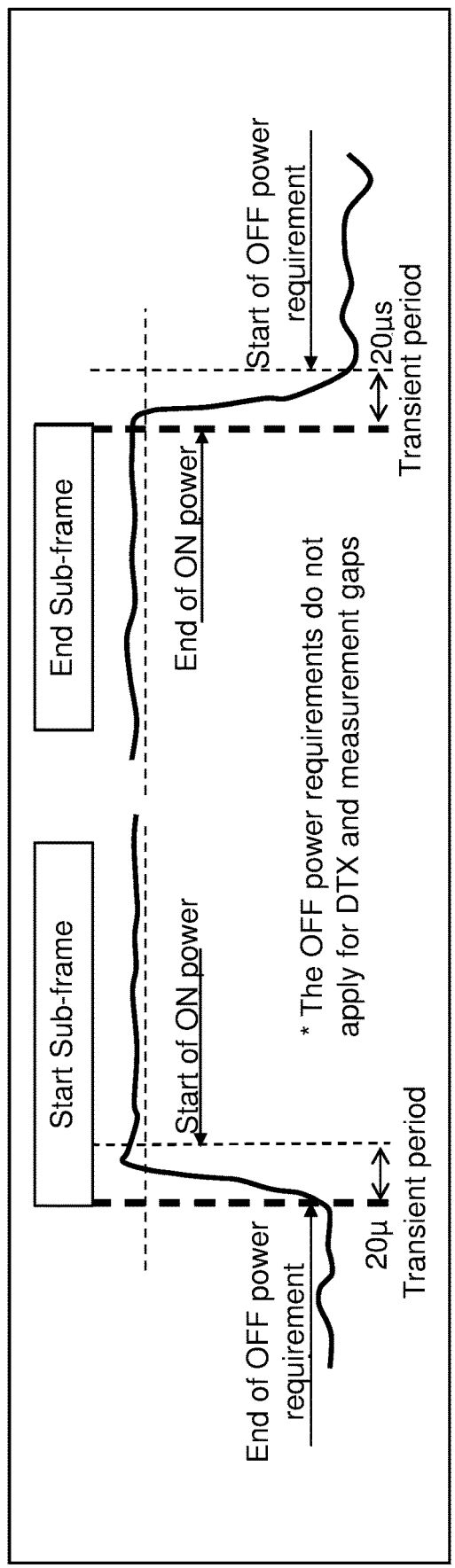
FIG. 4 illustrates an example of the general ON/OFF time mask.

Thus far, the transient period has been specified in the LTE specification as a fixed duration for different configurations. Each case caters for the worst chipset performance (since it is a minimum performance requirement). However, wireless devices (e.g., UEs) may have different capabilities in terms of transient time. This could be particularly true for New Radio (NR)/5G technology that will support multiple numerologies of the physical layer and a much wider range of frequency bands. In such a case, a wireless device cannot optimize its performance to meet all possible configurations.

Since there is not an efficient and reliable approach on the network node side to evaluate this wireless device transient time, the network node (e.g., base station (BS)) only considers the specified minimum performance requirements (that is, the worst-case parameter) for this transient time. Any wireless device optimization to improve this transient time is not useful from a network node demodulation performance point of view. The present disclosure contemplates various embodiments that may address these and other deficiencies associated with existing approaches.

According to one example embodiment, a method in a first node is disclosed. The first node (e.g., a wireless device) determines a time resource (e.g., TTI) over which the first node transmits a signal (e.g., a radio signal in a certain frequency band using a certain physical layer numerology) to a second node (e.g., a network node). The first node signals, to at least one of the second node or a third node (e.g., another network node or wireless device), information about one or more transient time parameters associated with the time resource. The one or more transient time parameters are used by the first node for transmitting the signal (e.g., a radio signal) to the second node during the time resource. The first node adapts a transmitter configuration of the first node for transmitting the signal to the second node based on one of the one or more transient time parameters.

According to another example embodiment, a method in a second node is disclosed. The second node (e.g., a network node) receives, from one or more of a first node (e.g., a wireless device) and a third node (e.g., another network node or wireless device), information about at least one transient time parameter supported by the first node for transmitting a signal (e.g., a radio signal) over a time resource to the second node. In certain embodiments, the second node may receive information about a plurality of transient time parameters supported by the first node for transmitting the signal over the time resource to the second node. In such a scenario, the second node may select one of the plurality of transient time parameters with which to configure the first node, and configure the first node with the selected one of the plurality of transient time parameters. The second node receives, from the first node, the signal over the time resource based on the at least one transient time parameter. In some cases, the second node may adapt a receiver configuration of the second node based on the selected one of the plurality of transient time parameters. In some cases, adapting the receiver configuration may comprise demodulating the received signal using the selected transient time parameter by removing one or more signal samples received from the first node during a transient time period associated with the selected one of the plurality of transient time parameters.

According to another example embodiment, a method in a third node (e.g., a network node) is disclosed. The third node (e.g., a network node) receives, from a first node (e.g., a wireless device), information about at least one transient time parameter supported by the first node for transmitting a signal (e.g., a radio signal) over a time resource to a second node (e.g., another network node or wireless device). The third node transmits the received information about the at least one transient time parameter to the second node. The information about the at least one transient time parameter may include one or more of: a duration of a corresponding transient time; an identifier of one of a plurality of transient times associated with the time resource; and an identifier of the time resource associated with the one or more transient time parameters.

Certain embodiments of the present disclosure may provide one or more technical advantages. As one example, certain embodiments may advantageously optimize network node demodulation performance. As another example, certain embodiments may advantageously enable better wireless device (e.g., UE) transient time, and thus better system performances. As another example, certain embodiments may advantageously relax the wireless device (e.g., UE) transient time requirement per TTI to guaranty strict minimum performances and thereby enable performance improvements. Other advantages may be readily apparent to one having skill in the art. Certain embodiments may have none, some, or all of the recited advantages.

Figure 6:
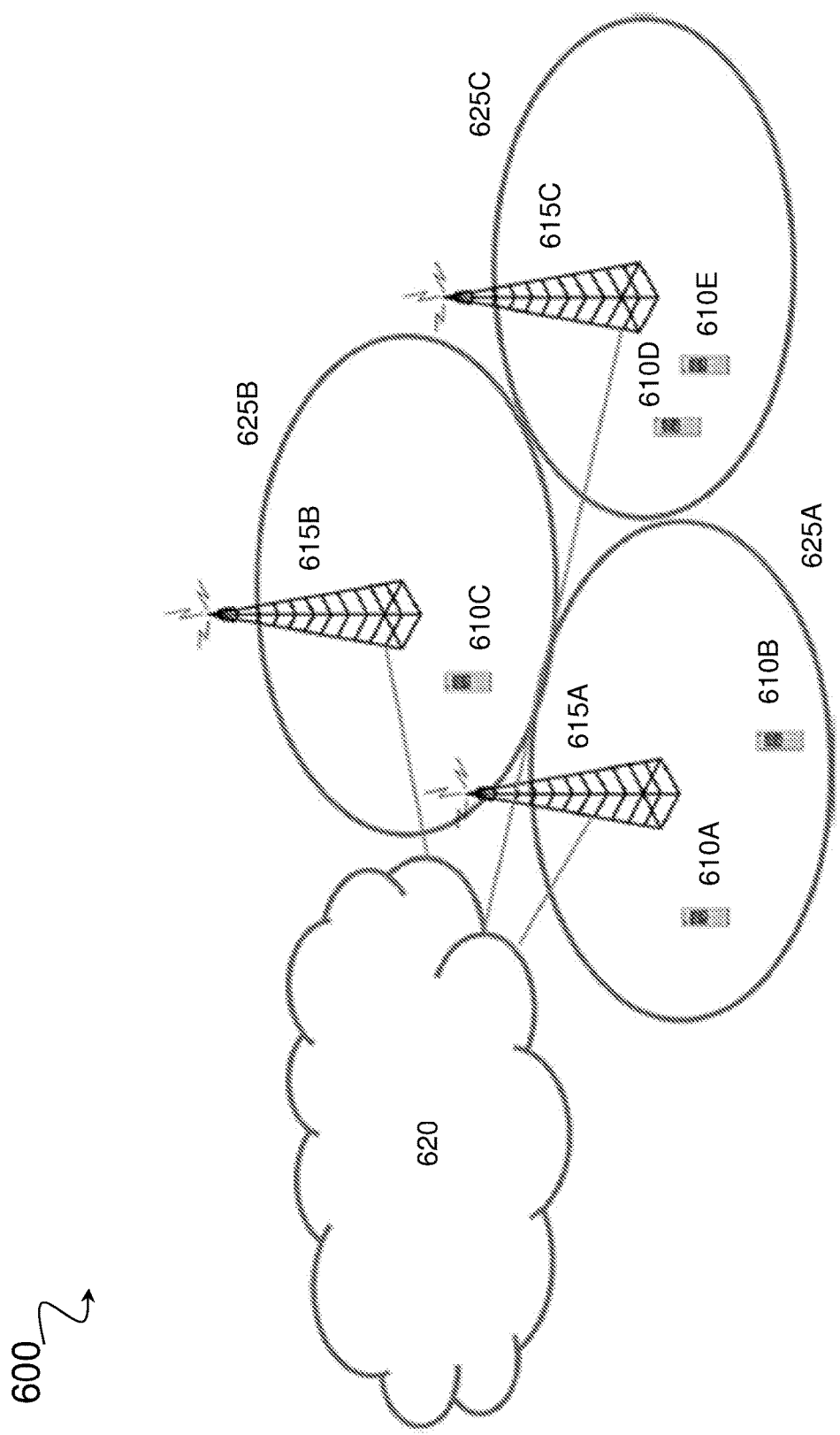
FIG. 6 is a is a block diagram illustrating an embodiment of a network, in accordance with certain embodiments.

FIG. 6 is a block diagram illustrating an embodiment of a network 600, in accordance with certain embodiments. Network 600 includes one or more wireless devices 610 (e.g., UEs), and one or more network node(s) 615 (e.g., eNBs or gNBs). More particularly, in the example of FIG. 6 network 600 includes wireless devices 610A-E and network nodes 615A-C. Wireless devices 610 may communicate with network nodes 615 over a wireless interface. For example, a wireless device 610 may transmit wireless signals to one or more of network nodes 615, and/or receive wireless signals from one or more of network nodes 615. The wireless signals may contain voice traffic, data traffic, control signals, and/or any other suitable information. In some embodiments, each network node 615 has an associated area of wireless signal coverage 625 (e.g., network node 615A has an associated area of wireless signal coverage 625A, network node 615B has an associated area of wireless signal coverage 625B, and network node 615C has an associated area of wireless signal coverage 625C). The area of wireless signal coverage 625 associated with a network node 615 may be referred to as a cell. In some embodiments, wireless devices 610 may have device-to-device (D2D) capability. Thus, wireless devices 610 may be able to receive signals from and/or transmit signals directly to another wireless device.

In certain embodiments, network nodes 615 may interface with a radio network controller (RNC). The RNC may control network nodes 615 and may provide certain radio resource management functions, mobility management functions, and/or other suitable functions. In certain embodiments, the functions of the RNC may be included in network node 615. The RNC may interface with a core network node. In certain embodiments, the RNC may interface with the core network node via an interconnecting network 620. Interconnecting network 620 may refer to any interconnecting system capable of transmitting audio, video, signals, data, messages, or any combination of the preceding. Interconnecting network 620 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 610. Wireless devices 610 may exchange certain signals with the core network node using the non-access stratum layer. In non-access stratum signaling, signals between wireless devices 610 and the core network node may be transparently passed through the radio access network. In certain embodiments, network nodes 615 may interface with one or more network nodes over an internode interface, such as, for example, an X2 interface.

As described above, example embodiments of network 600 may include one or more wireless devices 610, and one or more different types of network nodes 615 capable of communicating (directly or indirectly) with wireless devices 610.

In some embodiments, the non-limiting term wireless device is used. Wireless devices 610 described herein can be any type of wireless device capable of communicating with network nodes 615 or another wireless device in a cellular or mobile communication system (e.g., over radio signals). Examples of wireless devices include a UE, a radio communication device, target device, UE, D2D UE, machine-type-communication (MTC) UE or UE capable of machine-to-machine (M2M) communication, low-cost and/or low-complexity UE, a sensor equipped with UE, tablet, Personal Digital Assistant (PDA), mobile terminals, smart phone, laptop embedded equipped (LEE), laptop mounted equipment (LME), USB dongles, Customer Premises Equipment (CPE), etc. Wireless devices 610 may operate under either normal coverage or enhanced coverage with respect to its serving cell. The enhanced coverage may be interchangeably referred to as extended coverage. Wireless devices 610 may also operate in a plurality of coverage levels (e.g., normal coverage, enhanced coverage level 1, enhanced coverage level 2, enhanced coverage level 3 and so on). In some cases, wireless devices 610 may also operate in out-of-coverage scenarios.

Also, in some embodiments the non-limiting term network node is used. It can be any kind of network node or radio network node. Examples of network nodes include a base station (BS), radio BS, Node B, multi-standard radio (MSR) radio node such as MSR BS, eNB, Master eNB (MeNB), Secondary eNB (SeNB), gNB, network controller, RNC, BS controller (BSC), relay node, donor node controlling relay, base transceiver station (BTS), access point (AP), radio AP, transmission point, transmission node, Remote Radio Unit (RRU), Remote Radio Head (RRH), nodes in distributed antenna system (DAS), Multi-cell/multicast Coordination Entity (MCE), core network node (e.g., Mobile Switching Center (MSC), Mobility Management Entity (MME), etc.), Operations & Management (O&M), Operations Support System (OSS), Self-Organizing Network (SON), positioning node (e.g., Evolved-Serving Mobile Location Center (E-SMLC)), Minimization of Drive Test (MDT), or any other suitable network node.

The terminology such as network node and wireless device should be considered non-limiting and does not imply a certain hierarchical relation between the two. In general, a network node could be considered as device 1 and a wireless device considered as device 2, and these two devices communicate with each other over some radio channel.

Example embodiments of wireless devices 610, network nodes 615, and other network nodes (such as RNC or core network node) are described in more detail below with respect to FIGS. 10-14.

Although FIG. 6 illustrates a particular arrangement of network 600, the present disclosure contemplates that the various embodiments described herein may be applied to a variety of networks having any suitable configuration. For example, network 600 may include any suitable number of wireless devices 610 and network nodes 615, as well as any additional elements suitable to support communication between wireless devices or between a wireless device and another communication device (such as a landline telephone). Furthermore, although certain embodiments may be described as implemented in an LTE network, the embodiments may be implemented in any appropriate type of telecommunication system supporting any suitable communication standards (including 5G standards) and using any suitable components, and are applicable to any RAT or multi-RAT systems in which a wireless device receives and/or transmits signals (e.g., data). For example, the various embodiments described herein may be applicable to LTE, LTE-Advanced, NR, 4G, 5G, Narrowband Internet-of-Things (NB-IoT), MulteFire, UTRA, E-UTRA, UMTS, HSPA, GSM, cdma2000, WCDMA, WiMax, UMB, WiFi, Bluetooth, another suitable RAT, or any suitable combination of one or more RATs. In certain embodiments, wireless devices 610 and network nodes 615 may be capable of supporting a single or multiple RATs. Although certain embodiments may be described in the context of wireless transmissions in the UL, the present disclosure contemplates that the various embodiments are equally applicable in the DL.

As described above, the transient period has been specified in the LTE specification as a fixed duration for different configurations. Each case caters for the worst chipset performance (since it is a minimum performance requirement). However, wireless devices 610 (e.g., UEs) may have different capabilities in terms of transient time. This could be particularly true for NR/5G technology that will support multiple numerologies of the physical layer and a much wider range of frequency bands. In such a case, a wireless device 610 cannot optimize its performance to meet all possible configurations. The present disclosure contemplates various embodiments that may address this and other deficiencies associated with existing approaches.

According to a first example embodiment, a method in a first node (e.g., wireless device 610A) of determining and signaling a transient time parameter associated with a signal transmission over a time resource is disclosed. For example, wireless device 610A (Node 1) determines a time resource (e.g., TTI) over which wireless device 610A (Node 1) transmits a signal (e.g., a radio signal) to a second node (e.g., network node 615A). Wireless device 610A (Node 1) signals, to at least one of network node 615A (Node 2) or a third node (e.g., another network node 615, such as network node 615B, or another wireless device 610, such as wireless device 610B), information about one or more transient time parameters associated with the time resource. The one or more transient time parameters are used by wireless device 610A (Node 1) for transmitting the signal to network node 615A (Node 2) during the time resource. Wireless device 610A (Node 1) adapts a transmitter configuration of wireless device 610A (Node 1) for transmitting the signal to network node 615A (Node 2) based on one of the one or more transient time parameters.

Additional details of this first example embodiment are described below. Although the first example embodiment may be described herein using wireless device 610A as an example of the first node and network node 615A as an example of the second node, the present disclosure is not limited to such an example. Rather, the present disclosure contemplates that the first node, the second node, and the third node may be any suitable nodes within network 600. For example, in certain embodiments network node 615A (or another network node 615) may be the first node and wireless device 610A (or another wireless device 610) may be the second node.

As used herein, the term signal can be any physical signal or physical channel. Examples of DL physical signals are reference signals such as Primary Synchronization Signal (PSS), Secondary Synchronization Signal (SSS), Common Reference Signal (CRS), Positioning Reference Signal (PRS), Channel State Information (CSI) Reference Signal (CSI-RS), DMRS, Narrowband Reference Signal (NRS), Narrowband PSS (NPSS), Narrowband SSS (NSSS), Synchronization Signal (SS), Multicast-Broadcast Single-Frequency Network Reference Signal (MBSFN RS), etc. Examples of UL physical signals are reference signals such as Sounding Reference Signal (SRS), DMRS, etc. The term physical channel (e.g., in the context of channel reception) as used herein may also be referred to as "channel." The physical channel carries higher layer information (e.g., Radio Resource Control (RRC), logical control channel, etc.). Examples of DL physical channels are Physical Broadcast Channel (PBCH), Narrowband PBCH (NPBCH), Physical Downlink Control Channel (PDCCH), Physical Downlink Shared Channel (PDSCH), short (or shortened) PDSCH (sPDSCH), MPDCCH, NPDCCH, NPDSCH, E-PDCCH, or any other suitable DL physical channel. Examples of UL physical channels are Physical Uplink Control Channel (PUCCH), short (or shortened) PUCCH (sPUCCH), Physical Uplink Shared Channel (PUSCH), short (or shortened) PUSCH (sPUSCH), PUSCH, PUCCH, Narrowband PUSCH (NPUSCH), Physical Random Access Channel (PRACH), Narrowband PRACH (NPRACH), or any other suitable UL physical channel.

As used herein, the term time resource may correspond to any type of physical resource or radio resource expressed in terms of length of time. Signals are transmitted or received by a node over a time resource. Examples of time resources include, but are not limited to: symbol; time slot; subframe; radio frame; TTI; interleaving time; and any other suitable time resource. As used herein, the term TTI may correspond to any time period (T0) over which a physical channel can be encoded and interleaved for transmission. The physical channel is decoded by the receiver over the same time period (T0) over which it was encoded. The TTI may also be interchangeably referred to as short TTI (sTTI), transmission time, slot, sub-slot, mini-slot, short subframe, mini-subframe, etc.

As noted above, wireless device 610A (the first node in the present example) determines a time resource (Tr) over which wireless device 610A (Node 1) transmits a signal (S1) (e.g., a radio signal) to network node 615A (the second node in the present example). The time resource (Tr) may be a time resource used or expected to be used by wireless device 610A (Node 1) for transmitting the signal to network node 615A (Node 2). For example, wireless device 610A (Node 1) may determine a time resource over which wireless device 610A (Node 1) transmits a signal to network node 615A (Node 2) in cell 625A on a carrier (F1). Examples of time resources include, but are not limited to, symbol, TTI, slot, sTTI, etc. Examples of signals include SRS, PUSCH, PUCCH, sPUCCH, RACH, sPUSCH, etc. In certain embodiments, wireless device 610A (Node 1) may determine a plurality of time resources (e.g., Tr1, Tr2, . . . Trn) for transmitting a plurality of signals (e.g., S1, S2, . . . Sn), respectively, to network node 615A (Node 2)

Wireless device 610A (Node 1) may determine the time resource (Tr) (or a plurality of time resources (Tr1, Tr2, . . . Trn)) in any suitable manner. As one example, wireless device 610A (Node 1) may determine the time resource based on one or more rules (e.g., predefined rules). As another example, wireless device 610A (Node 1) may receive the time resource from another node (e.g., network node 615A (Node 2), another network node 615, or another wireless device 610). As another example, wireless device 610A (Node 1) may determine the time resource(s) based on pre-defined information (e.g., a relation between a first time resource (e.g., Tr1, such as a TTI) and frequency band of F1). As another example, wireless device 610A (Node 1) may determine the time resource(s) based on a configuration received from a network node 615 (e.g., Primary Cell (PCell), Secondary Cell (SCell), etc.). In such a scenario, wireless device 610A (Node 1) may, for example, determine the TTI pattern used in any time instance in any carrier by receiving control signals in DL or by receiving an RRC message. As another example, wireless device 610A (Node 1) may determine the time resource based on one or a plurality of TTIs supported by wireless device 610A (Node 1).

In certain embodiments, wireless device 610A (Node 1) may determine one or more transient time parameters (Tt) associated with the time resource (Tr). The transient time parameter (Tt) may be associated with transmission of the signal by wireless device 610A over at least one determined time resource (e.g., Tr1). The one or more transient time parameters are used by wireless device 610A (Node 1) for transmitting the signal (S1) (e.g., a radio signal) to network node 615A (Node 2) during the time resource.

Figure 5:
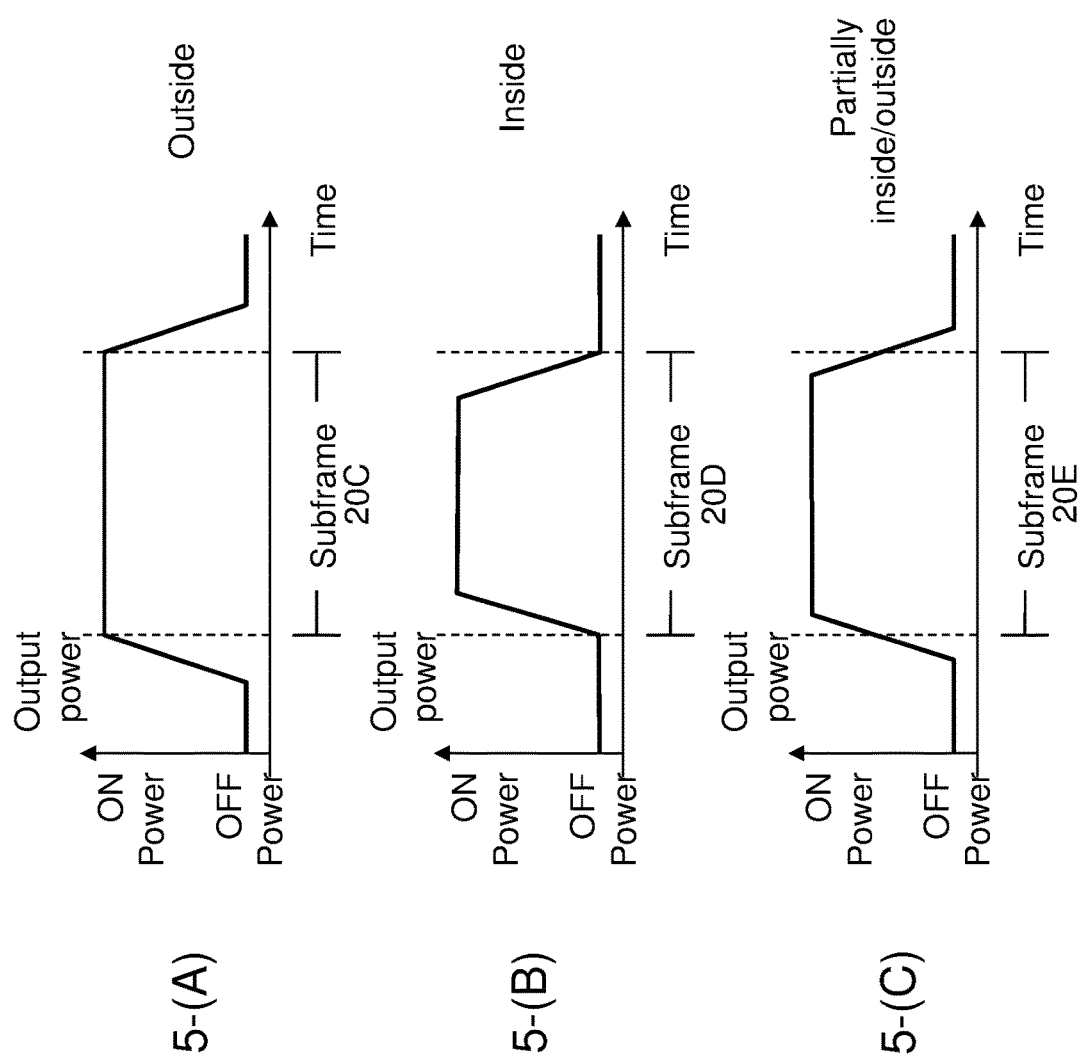
FIG. 5 illustrates examples of the different possibilities for location of the power ramps.

The one or more transient time parameters define at least a time period between any two points in time over which the first node changes its signal characteristics (e.g., transmit power). As one example, the change in signal characteristics may be a change in transmit power going from an OFF power limit to an ON power limit. As additional examples, the transient time parameter may refer to a transient time duration during which the transmit signal changes between ON period and OFF period or the duration during which the signal changes its transmit power level (e.g., from power P1 to power P2, or vice versa), or to a value indicative of the transient time duration (such as an index value that corresponds to a transient time duration). One such change in transmit power is shown in FIG. 5, in which a wireless device, during a transient time, changes its power from OFF power level to ON power level or from ON power level to OFF power level. As another example, the change in signal characteristics may be a transition between two frequencies in case of frequency hopping.

The transient time may also be referred to as ramp up time or ramp down time in the transmit power time mask, as well as ramping time, slew, etc. The transient time can lie between any sets of time resources (e.g., UL and DL subframes, between any two symbols, between any group of symbols, between any group of slots or subframes, etc.). During a transient time, a wireless device 610 may not be required to meet any requirement (e.g., such as OFF power limit, ON power limit, transmit power accuracy, etc.).

As used herein, the term requirement(s) may comprise any type of requirements related to wireless device measurements (also known as radio requirements, measurement requirements, Radio Resource Management (RRM) requirements, mobility requirements, positioning measurement requirements, etc.). Examples of wireless device requirements related to measurements are measurement time, measurement reporting time or delay, measurement accuracy (e.g., Reference Signal Received Power (RSRP)/Reference Signal Received Quality (RSRQ) accuracy), number of cells to be measured over the measurement time, etc. Examples of measurement time include L1 measurement period, cell identification time or cell search delay, CGI acquisition delay, etc.

Wireless device 610A (Node 1) may determine the one or more transient time parameters (Tt) associated with the time resource (e.g., Tr1) in any suitable manner. The transient time parameter associated with the time resource may vary semi-statically or dynamically over time. The transient time value may depend on one or a plurality of factors, which may be used by wireless device 610A (Node 1) for determining at least one transient time parameter associated with the time resource. A first example factor on which the transient time value may depend is a duration of the time resource (e.g., a length of TTI, a length of symbol, etc.) over which wireless device 610A (Node 1) transmits signals. In some cases, the transient time can be shorter for shorter duration of the time resources. For example, the transient times can be: 20 μs for TTI of 14-OS, 12 μs for TTI of 7-OS and 5 μs for TTI of 2-OS.

A second example factor on which the transient time value may depend is a numerology of signals to be transmitted by wireless device 610A (Node 1), such as subcarrier spacing, CP length of symbol, etc.). In some cases, the transient time can be shorter for larger subcarrier spacing. As an example, the transient time can be 20 is and 5 μs for subcarrier spacings of 15 KHz and 60 KHz, respectively.

A third example factor on which the transient time value may depend is type of signals transmitted by wireless device 610A (Node 1) in the time resource (e.g., DMRS, SRS, sPUSCH, etc.). In some cases, the transient time can be shorter for shorter time resources while longer for longer time resources. For example, the transient time used by wireless device 610A (Node 1) for transmitting DMRS or SRS can be shorter compared to the transient time used by wireless device 610A (Node 1) for transmitting sPUSCH.

A fourth example factor on which the transient time value may depend is RF filter implementation in wireless device 610A (Node 1). In some cases, a filter of higher order can result in shorter transient time compared to a lower order filter. For example, a higher order filter may achieve shorter transient time compared to a lower order filter. However, compared to lower order filtering, higher order filtering involves more complexity, larger number of computations, more processing and increased power consumption, etc. For example, due to reduced computational complexity and power consumption, wireless device 610A (Node 1) may apply lower order filtering resulting in larger transient time (e.g., 20 μs instead of 10 μs).

A fifth example factor on which the transient time value may depend is an amount of available resources in wireless device 610A (Node 1) for transmitting signals (e.g., memory, processing resources, etc.). If wireless device 610A (Node 1) has a large amount of processing resources, then the transient time can be shorter compared to the case when wireless device 610A (Node 1) has few processing resources. For example, if an available resource (e.g., memory) is above a threshold (e.g., a memory threshold) (H) then the transient time can be 12 μs for TTI of 7-OS. But if an available resource (e.g., memory) is equal to or below H then the transient time can be 20 μs for TTI of 7-OS.

In certain embodiments, the transient time value may be determined based on any suitable combination of the various example factors described above.

In certain embodiments, wireless device 610A (Node 1) may determine at least two transient time parameters (Tt1, Tt2, . . . Tn) associated with the same time resource. In certain embodiments, the two or more transient time parameters may be dependent on different time resources (e.g., TTI), different frequency bands, and/or different physical layer numerology. In certain embodiments, wireless device 610A (Node 1) is capable of using any of Ttn values for transmitting signals to network node 615A (Node 2) during the same time resource. In certain embodiments, wireless device 610A (Node 1) may use the same criteria (e.g., one or more of the example factors described above on which the transient time value may depend) for determining the transient times for the same time resource. For example, for transmitting signals (e.g., radio signals) over 2-OS TTI, wireless device 610A (Node 1) may be able to use a transient time of either 5 μs or 10 μs.

Wireless device 610A (Node 1) signals, to at least one of the network node 615A (Node 2) or a third node (e.g., another wireless device 610 or another network node 615, such as network node 615B), information about one or more transient time parameters (Tt) associated with the time resource (Tr). In some cases, the one or more transient time parameters may, as described above, be determined by wireless device 610A (Node 1). As described above, the one or more transient time parameters (Tt) are supported or used by the wireless device 610A (Node 1) for transmitting the signal (S1) to network node 615A (Node 2) in cell 625A during the time resource (Tr).

In this step, wireless device 610A (Node 1) signals or transmits information about the transient time parameter(s) associated with the determined time resource (Tr) to network node 615A (Node 2). The information about the one or more transient time parameters may comprise any suitable information. For example, the information may comprise one or more of: an actual duration of the transient time; and a predefined identifier of one of the plurality of transient times associated with the same time resource (e.g., one of 5 μs, 10 μs and 20 μs for 7-OS TTI). In certain embodiments, the information may comprise an identifier of the time resource associated with the determined transient time value. In some cases, wireless device 610A (Node 1) may also transmit information related to a plurality of transient time parameters, each associated with a different time resource (e.g., 5 μs and 10 μs for sPUSCH TTI of 2-OS and 7-OS, respectively).

In certain embodiments, wireless device 610A (Node1) may transmit information to network node 615A (Node 2) without receiving a request from network node 615A (Node 2) or any other node (e.g., another network node 615, such as network node 615B, or another wireless device 610). In certain embodiments, wireless device 610A (Node 1) may transmit information to network node 615A (Node 2) upon receiving a request from network node 615A (Node 2) or from a third node (Node 3). In certain embodiments, wireless device 610A (Node 1) may transmit information to another node (e.g., the third node (Node 3)), and the other node may in turn transmit the received information to network node 615A (Node 2). The request may comprise any suitable information. For example, in certain embodiments the request from network node 615A (Node 2) or another node (Node 3) may include information about the time resource whose transient time information is required from wireless device 610A (Node 1).

Wireless device 610A may signal the information about the one or more transient time parameters associated with the time resource at any suitable time. For example, wireless device 610A (Node 1) may transmit information to network node 615A (Node 2) and/or a third node (Node 3) periodically. As another example, wireless device 610A (Node 1) may transmit information to network node 615A (Node 2) and/or the third node (Node 3) when there is a change in the transient time used by wireless device 610A (Node 1) for transmitting signals to network node 615A (Node 2).

The information about the one or more transient time parameters associated with the time resource may be signaled in any suitable manner. As one example, the information may be part of capability information, which can be sent to network node 615A (Node 2) and/or the third node (Node 3) during idle state and/or in connected state. As another example, the signaling between wireless device 610A (Node 1) and network node 615 (Node 2) and/or the third node (Node 3) can be carried out by using any suitable signaling protocol or configuration mechanism. Examples of signaling protocol include RRC signaling, Medium Access Control (MAC) signaling, Layer 1 signaling (e.g., over physical control channel such as PUCCH, etc.).

In certain embodiments, wireless device 610A may signal to network node 615A (Node 2) and/or to the third node (Node 3) information about at least two transient time parameters associated with the time resource. The at least two transient time parameters (e.g., Tt1, Tt2, Ttn) may be transient time parameters supported or used by wireless device 610A (Node 1) to transmit the signal (S1) in cell 625A over the time resource (Tr) to network node 615A (Node 2).

In such a scenario (in which the information about the one or more transient time parameters signaled to network node 615A (Node 2) by wireless device 610A (Node 1) includes information about at least two transient time parameters associated with the same time resource), wireless device 610A may receiving a configuration from network node 615A (Node 2) and/or the third node (Node 3). The configuration may request wireless device 610A (Node 1) to apply one of the at least two transient time parameters for transmitting signals (e.g., radio signals) to network node 615A (Node 2) over the time resource.

For example, wireless device 610A (Node 1) may be configured by network node 615A (Node 2) and/or the third node (Node 3) to use one of the at least two transient time parameters indicated by wireless device 610A. In certain embodiments, wireless device 610A (Node 1) may receive the configuration information in response to transmitting to network node 615A (Node 2) and/or the third node (Node 3) the information about the determined transient times associated with the same time resource.

Wireless device 610A (Node 1) adapts a transmitter configuration of wireless device 610A for transmitting the signal (S1) to network node 615A (Node 2) based on one of the one or more transient time parameters. In this step, wireless device 610A (Node 1) adapts its transmitter circuitry for transmitting signals to network node 615A (Node 2). In certain embodiments, wireless device 610A adapts the transmitter configuration after signaling the information about the one or more transient time parameters to network node 615A (Node 2) and/or the third node (Node 3). In some cases, the adaptation is done to ensure that when transmitting signals over the time resource (Tr) the transient time (Tt) is according to the value indicated to network node 615A (Node 2).

Wireless device 610A (Node 1) may adapt the transmitter configuration in any suitable manner. As one example, wireless device 610A (Node 1) may adapt the transmitter configuration based on one of the one or more transient time parameters to ensure that its ON/OFF behavior in the time resource meets one or more pre-defined requirements. This in turn may advantageously ensure that the distortion of the transmitted signal is minimized due to shorter transient time.

As described above, in certain embodiments wireless device 610A (Node 1) may signal information about at least two transient time parameters associated with the time resource (Tr) to network node 615A (Node 2) and/or the third node (Node 3), and be configured to apply one of the at least two transient time parameters for transmitting signals to network node 615A (Node 2) over the time resource. In such a scenario, wireless device 610A (Node 1) may adapt its transmitter circuitry for transmitting the signal (S1) to network node 615A (Node 2) based on the configured transient time parameter.

For example, after receiving the configuration information from network node 615A (Node 2) and/or the third node (Node 3), wireless device 610A (Node 1) may adapt its transmitter circuitry for transmitting signals (e.g., radio signals) to network node 615A (Node 2) in the time resource (Tr) related to the configured transient time value. The adaptation may be based on any suitable criteria. For example, the adaptation may be based on the configured transient time value. In certain embodiments, if no configuration is received from any other node (e.g., network node 615A (Node 2) or the third node (Node 3)), then wireless device 610A (Node 1) may adapt its transmitter circuitry based on a default value, which can be pre-defined or derived based on one or more rules. In certain embodiments, the one or more rules may be expressed in terms of a function of two or more transient time values. Examples of function include minimum, maximum, average, xth percentile, or any other suitable function.

According to a second example embodiment, a method in a second node (e.g., network node 615A) of receiving one or more transient time parameters associated with a signal (e.g., a radio signal) transmission over a time resource and using the received one or more transient time parameters for operational tasks is disclosed. Network node 615A (Node 2) receives, from one or more of a first node (e.g., wireless device 610A) and a third node (e.g., another network node 615, such as network node 615B, or another wireless device, such as wireless device 615B), information about at least one transient time parameter supported by wireless device 610A (Node 1) for transmitting a signal (e.g., a radio signal) over a time resource to network node 615A (Node 2). In certain embodiments, network node 615A (Node 2) may receive information about a plurality of transient time parameters supported by wireless device 610A (Node 1) for transmitting the signal over the time resource to network node 615A (Node 2). In such a scenario, network node 615A (Node 2) may select one of the plurality of transient time parameters with which to configure wireless device 610A (Node 1), and configure wireless device 610A (Node 1) with the selected one of the plurality of transient time parameters. Network node 615A (Node 2) receives, from wireless device 610A (Node 1), the signal (e.g., a radio signal) over the time resource based on the at least one transient time parameter. In some cases, network node 615A (Node 2) may adapt a receiver configuration of network node 615A (Node 2) based on the selected one of the plurality of transient time parameters. In some cases, adapting the receiver configuration may comprise demodulating the received signal using the selected transient time parameter by removing one or more signal samples received from wireless device 610A (Node 1) during a transient time period associated with the selected one of the plurality of transient time parameters.

Additional details of this second example embodiment are described below. Although the second example embodiment may be described herein using wireless device 610A as an example of the first node and network node 615A as an example of the second node, the present disclosure is not limited to such an example. Rather, the present disclosure contemplates that the first node, the second node, and the third node may be any suitable nodes within network 600. For example, in certain embodiments network node 615A (or another network node 615) may be the first node and wireless device 610A (or another wireless device 610) may be the second node.

As described above, network node 615A (Node 2) receives, from one or more of wireless device 610A (Node 1) and a third node (Node 3), information about at least one transient time parameter (Tt) supported or used by wireless device 610A (Node 1) for transmitting a signal (S1) (e.g., a radio signal) in cell 625A over a time resource (Tr) to network node 615A (Node 2). In some cases, network node 615A (Node 2) may receive information about a plurality of transient time parameters (e.g., Tt1, Tt2, Ttn) supported or used by wireless device 610A (Node 1) to transmit the signal (S1) in cell 625A over the time resource (Tr) to network node 615A (Node 2).

The information about the at least one transient time parameter supported or used by wireless device 610A (Node 1) may be received in any suitable manner, and may be received periodically and/or when there is a change in the transient time used by wireless device 610A (Node 1) for transmitting signals to network node 615A (Node 2). Similar to the first example embodiment described above, the information about the one or more transient time parameters associated with the time resource may be received in a variety of ways. As one example, the information may be part of capability information, which can be received by network node 615A (Node 2) during idle state and/or in connected state. As another example, the signaling between wireless device 610A (Node 1) and network node 615A (Node 2) and/or the third node (Node 3) can be carried out by using any suitable signaling protocol or configuration mechanism. Examples of signaling protocol include RRC signaling, MAC signaling, Layer 1 signaling (e.g., over physical control channel such as PUCCH, etc.). In certain embodiments, network node 615A (Node 2) may receive the information autonomously from wireless device 610A (Node 1) and/or the third node (Node 3). In certain embodiments, network node 615A (Node 2) may receive the information in response to sending a request to wireless device 610A (Node 1) and/or the third node (Node 3).

In certain embodiments network node 615A (Node 2) may receive information about one or a plurality of transient time parameters associated with the same Tr for more than one time resource. For example, network node 615A (Node 2) may receive Tt1 and Tt2 for the same time resource Tr1 and also receive Tt11 and Tt21 for the same but another time resource Tr2. Examples of Tr1 and Tr2 are symbol in which Node1 transmits SRS and 2-OS TTI for sPUSCH transmission respectively.

In certain embodiments, when network node 615A (Node 2) receives information about a plurality of transient time parameters supported by wireless device 610A (Node 1), network node 615A (Node 2) may configure wireless device 610A (Node 1) with one of the plurality of transient time parameters included in the received information. For example, if network node 615A (Node2) receives information about two or more transient time parameters related to the same time resource from wireless device 610A (Node 1) and/or the third node (Node 3), then network node 615A (Node 2) selects one of received transient time parameters. After selecting the transient time parameter, network node 615A (Node 2) configures wireless device 610A (Node 1) with the selected transient time parameter, which is to be used by wireless device 610A (Node 1) when transmitting signals to network node 615A (Node 2) over the time resource. In certain embodiments, network node 615A (Node 2) may additionally or alternatively signal the selected transient time parameter value or associated information (e.g., a pre-defined identifier) to the third node (Node 3). The third node (e.g., another network node 615, such as network node 615B, or another wireless device 610, such as wireless device 610B) may further configure wireless device 610A (Node 1) with the parameter value received from the third node (Node 3).

In certain embodiments, network node 615A (Node 2) determines or selects an appropriate value of the transient time parameter out of the received values based on one or more criteria associated with at least a receiver capability of network node 615A (Node 2). An example criterion is transport format of the signal transmitted by wireless device 610A (Node 1). Examples of parameters defining transport format include coding rate, modulation order or type, etc. For example, if the receiver of network node 615A (Node 2) is more robust then network node 615A (Node 2) may select a relatively large transient time. A receiver is considered to be more robust if it more effectively eliminates or minimizes interference compared to a receiver that is less robust. In another example, if the signal transmitted by wireless device 610A (Node 1) uses a lower code rate and/or a lower order modulation, then network node 615A (Node 2) may select a shorter transient time parameter. But if the signal transmitted by wireless device 610A (Node 1) uses a higher code rate and/or a higher order modulation then network node 615A (Node 2) may select a longer transient time parameter for the same time resource. Examples of lower code rate and higher code rate are ¼ and ½, respectively. Examples of shorter and longer transient times are 5 μs and 20 μs, respectively, for the same time resource (e.g., 2-OS TTI for sPUCCH or sPUSCH).

Network node 615A (Node 2) receives, from wireless device 610A (Node 1), the signal (S1) in cell 625A over the time resource based on the received at least one transient time parameter (or the configured transient time parameter if a plurality of transient time parameters were received). In other words, wireless device 610A (Node 1) transmits the signal according to the transient time parameter signaled to or selected by network node 615A (Node 2) as described above.

In certain embodiments, network node 615A (Node 2) may adapt its receiver configuration based on one of the one or more transient time parameters. Network node 615A (Node 2) may adapt its receiver configuration in any suitable manner. For example, network node 615A (Node 2) may demodulate the received signal using the received or selected transient time parameters (e.g., signaled by wireless device 610A (Node 1)) to optimize reception performance of the signals from wireless device 610A (Node 1). In one example, the receiver of network node 615A (Node 2) removes one or more signal samples received from wireless device 610A (Node 1) during the relevant transient time period. This may be because such signal samples are distorted or impaired. By eliminating such distorted received signals, the reception quality may be advantageously enhanced at network node 615A (Node 2). In certain embodiments, this may also advantageously reduce processing at network node 615A (Node 2) because only signals during ON duration in the time resource are used for the demodulation process at network node 615A (Node 2). Additionally, the number of distorted samples of the signal transmitted by wireless device 610A (Node 1) may also be minimized due to the shorter transient time.

As an elaboration of this step, in certain embodiments the receiver of network node 615A (Node 2) receives the signal within the time window of the TTI (which could be a short TTI also). However, with the indication received from wireless device 610A (Node 1), the receiver at network node 615A (Node 2) knows which part of the received signal(s) should be omitted in the demodulation procedure.

In certain embodiments, network node 615A may perform one or more other operations based on the determined transient time parameter. For example, network node 615A may adapt scheduling of signals to wireless device 610A (Node 1).

According to a third example embodiment, a method in a third node (e.g., a network node 615, such as network node 615B) is disclosed. Network node 615B (Node 3) receives, from a first node (e.g., wireless device 610A), information about at least one transient time parameter supported by wireless device 610A (Node 1) for transmitting a signal (e.g., a radio signal) over a time resource to a second node (e.g., another network node, such as network node 615A). Network node 615B (Node 3) transmits the received information about the at least one transient time parameter to network node 615B (Node 2). The information about the at least one transient time parameter may include one or more of: a duration of a corresponding transient time; an identifier of one of a plurality of transient times associated with the time resource; and an identifier of the time resource associated with the one or more transient time parameters.

Although the third example embodiment is described herein using wireless device 610A as an example of the first node (Node 1), network node 615A as an example of the second node (Node 2), and network node 615B as an example of the third node (Node 3), the present disclosure is not limited to such an example. Rather, the present disclosure contemplates that the first node, the second node, and the third node may be any suitable nodes within network 600. For example, in certain embodiments network node 615A (or another network node 615) may be the first node, wireless device 610A (or another wireless device 610) may be the second node, and the third node may be another wireless device 610 (e.g., wireless device 610B).

Figure 7:
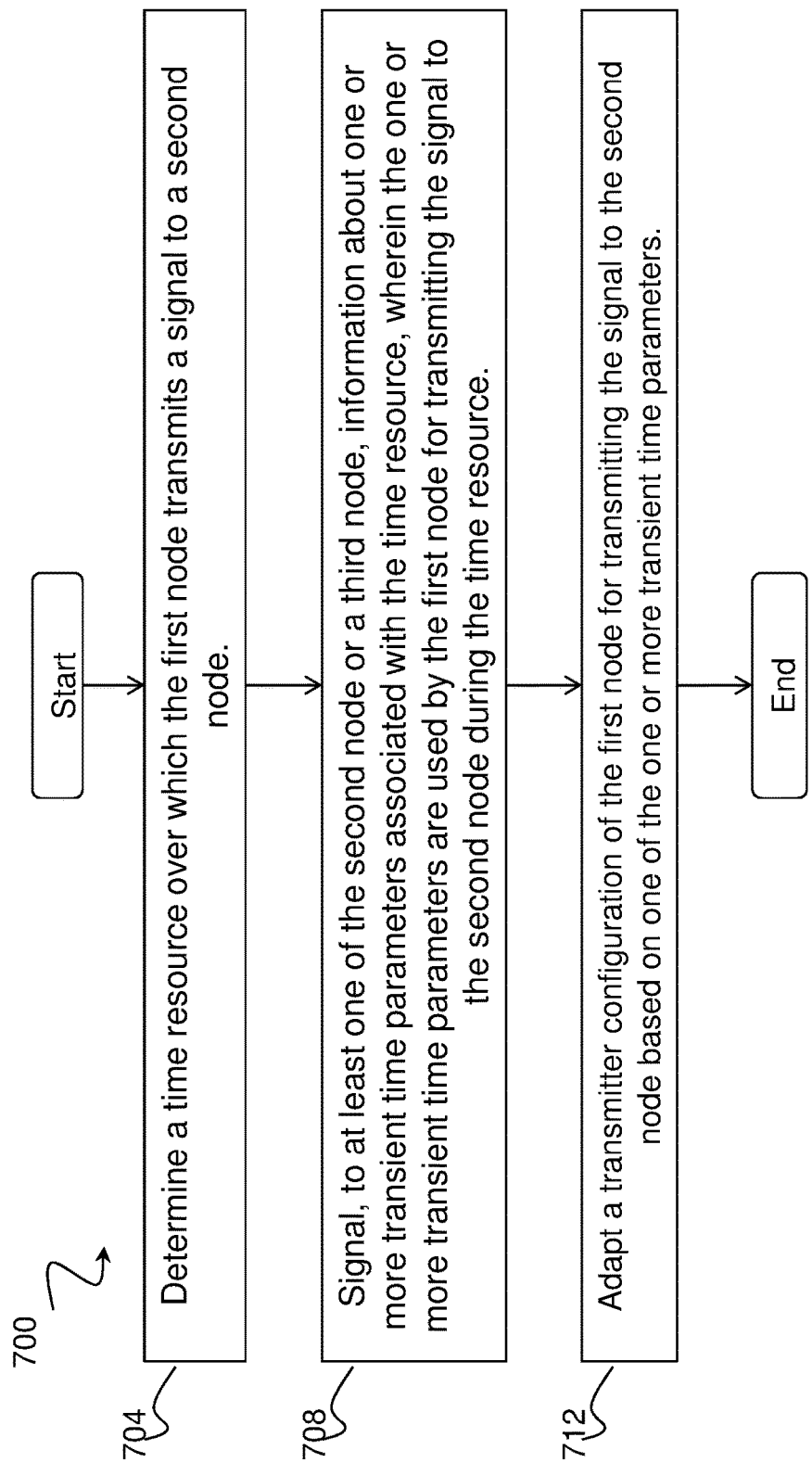
FIG. 7 is a flow diagram of a method in a first node, in accordance with certain embodiments.

FIG. 7 is a flow diagram of a method 700 in a first node, in accordance with certain embodiments. Method 700 begins at step 704, where the first node determines a time resource over which the first node transmits a signal (e.g., a radio signal) to a second node. In certain embodiments, the first node may be a wireless device and the second node may be a network node. In certain embodiments, the first node may be a network node and the second node may be a wireless device.

In certain embodiments, determining the time resource over which the first node transmits the signal to the second node may comprise one or more of: determining the time resource based on one or more pre-defined rules; and receiving the time resource from another node. In certain embodiments, determining the time resource over which the first node transmits the signal to the second node may be based on one or more of: pre-defined information; a configuration received from another node; and one or more transmission time intervals supported by the first node.

At step 708, the first node signals, to at least one of the second node or a third node, information about one or more transient time parameters associated with the time resource, wherein the one or more transient time parameters are used by the first node for transmitting the signal to the second node during the time resource. In certain embodiments, the information about the one or more transient time parameters may be signaled in response to a request.

In certain embodiments, the one or more transient time parameters may define at least a time period between any two points in time over which the first node changes its transmit power. In certain embodiments, the method may comprise determining the one or more transient time parameters associated with the time resource based on one or more of: a duration of the time resource; a numerology of the signal to be transmitted by the first node; a type of signal to be transmitted by the first node in the time resource; a frequency band of the signal to be transmitted by the first node; a radio frequency filter implementation in the first node; and an amount of available resources in the first node for transmitting signals.

In certain embodiments, the information about the one or more transient time parameters may comprise one or more of: a duration of a corresponding transient time; an identifier of one of a plurality of transient times associated with the time resource; and an identifier of the time resource associated with the one or more transient time parameters.

In certain embodiments, the one or more transient time parameters may consist of a single transient time parameter associated with the time resource.

In certain embodiments, the one or more transient time parameters may comprise at least two transient time parameters associated with the time resource. The method may comprise receiving, from at least one of the second node and the third node, a configuration requesting the first node to apply one of the at least two transient time parameters for transmitting the signal to the second node.

At step 712, the first node adapts a transmitter configuration of the first node for transmitting the signal to the second node based on one of the one or more transient time parameters. In certain embodiments, adapting the transmitter configuration of the first node for transmitting the signal to the second node based on one of the one or more transient time parameters may comprise one or more of: adapting the transmitter configuration such that an ON/OFF behavior of the first network node in the time resource meets one or more pre-defined requirements; and adapting the transmitter configuration such that the signal is transmitted according to one of the one or more transient time parameters. In certain embodiments, the method may comprise transmitting the signal to the second node using the adapted transmitter configuration.

Figure 8:
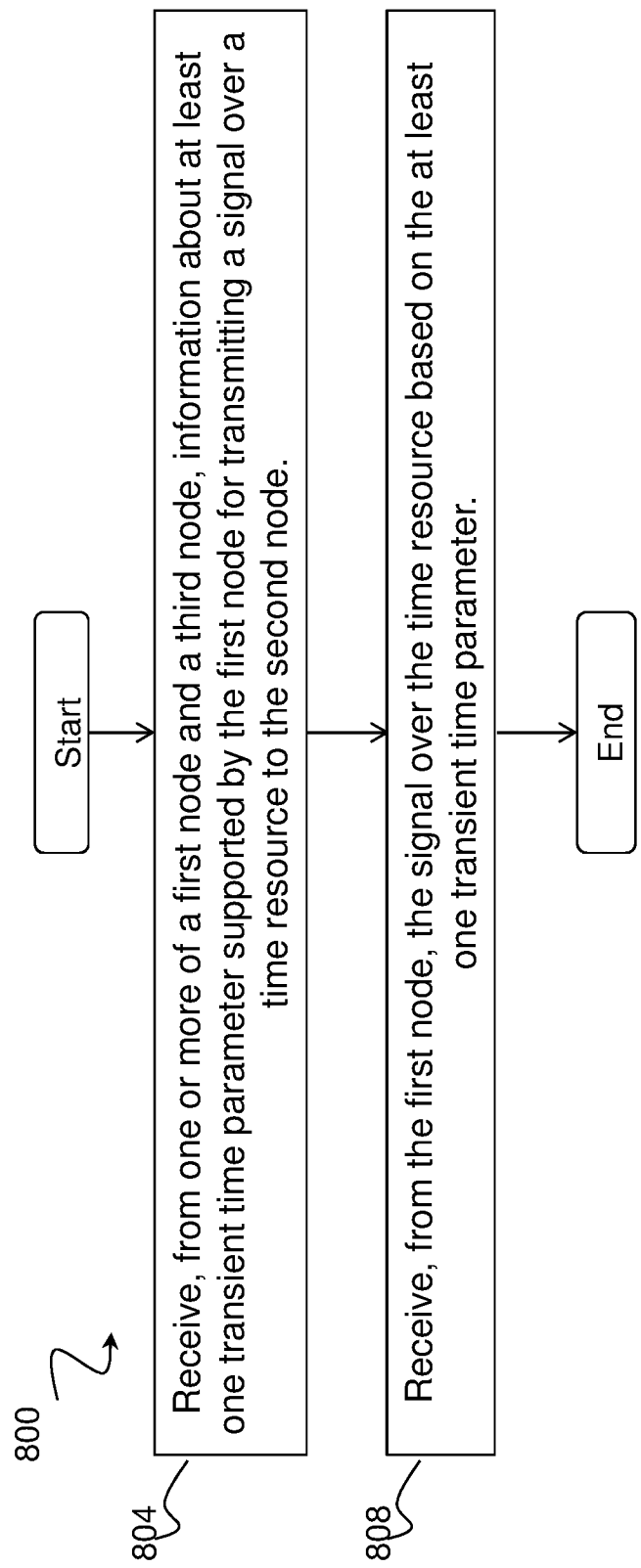
FIG. 8 is a flow diagram of a method in a second node, in accordance with certain embodiments.

FIG. 8 is a flow diagram of a method 800 in a second node, in accordance with certain embodiments. Method 800 begins at step 804, where the second node receives, from one or more of a first node and a third node, information about at least one transient time parameter supported by the first node for transmitting a signal (e.g., a radio signal) over a time resource to the second node. In certain embodiments, the first node may be a wireless device and the second node may be a network node. In certain embodiments, the first node may be a network node and the second node may be a wireless device.

In certain embodiments, the information about the at least one transient time parameter may be received in response to a request sent by the second node. In certain embodiments, receiving information about the at least one transient time parameter may comprise receiving information about a plurality of transient time parameters supported by the first node for transmitting the signal over the time resource to the second node.

In certain embodiments, the information about the one or more transient time parameters may comprise one or more of: a duration of a corresponding transient time; an identifier of one of a plurality of transient times associated with the time resource; and an identifier of the time resource associated with the one or more transient time parameters.

At step 808, the second node receives, from the first node, the signal over the time resource based on the at least one transient time parameter.

In certain embodiments, the method may comprise selecting one of the plurality of transient time parameters with which to configure the first node, and configuring the first node with the selected one of the plurality of transient time parameters. In certain embodiments, the selection may be based on at least one of: a receiver capability of the second node; and a transport format of the signal transmitted by the first node.

In certain embodiments, the method may comprise adapting a receiver configuration of the second node based on the selected one of the plurality of transient time parameters. In certain embodiments, adapting the receiver configuration may comprise demodulating the received signal using the selected transient time parameter by removing one or more signal samples received from the first node during a transient time period associated with the selected one of the plurality of transient time parameters.

Figure 9:
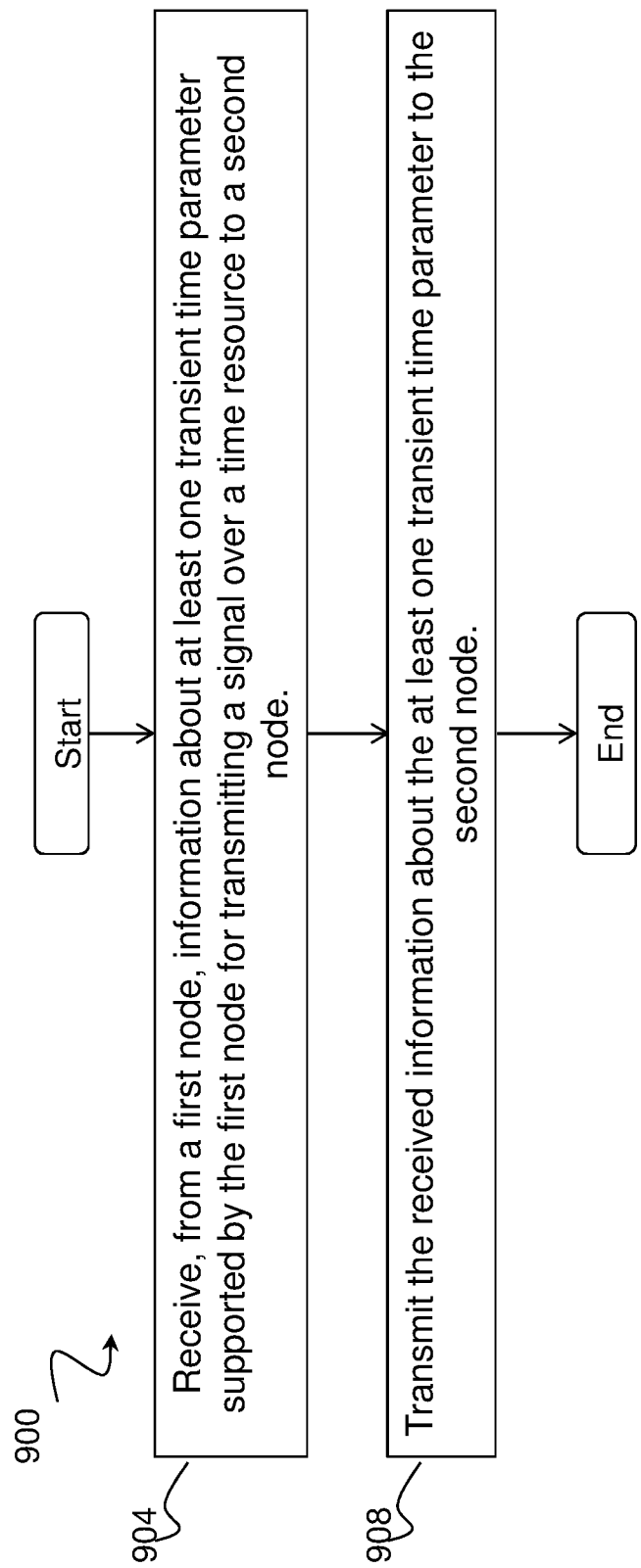
FIG. 9 is a flow diagram of a method in a third node, in accordance with certain embodiments.

FIG. 9 is a flow diagram of a method 900 in a third node, in accordance with certain embodiments. Method 900 begins at step 904, where the third node receives, from a first node, information about at least one transient time parameter supported by the first node for transmitting a signal (e.g., a radio signal) over a time resource to a second node. In certain embodiments, the information about the at least one transient time parameter may comprise one or more of: a duration of a corresponding transient time; an identifier of one of a plurality of transient times associated with the time resource; and an identifier of the time resource associated with the one or more transient time parameters.

At step 908, the third node transmits the received information about the at least one transient time parameter to the second node.

Figure 10:
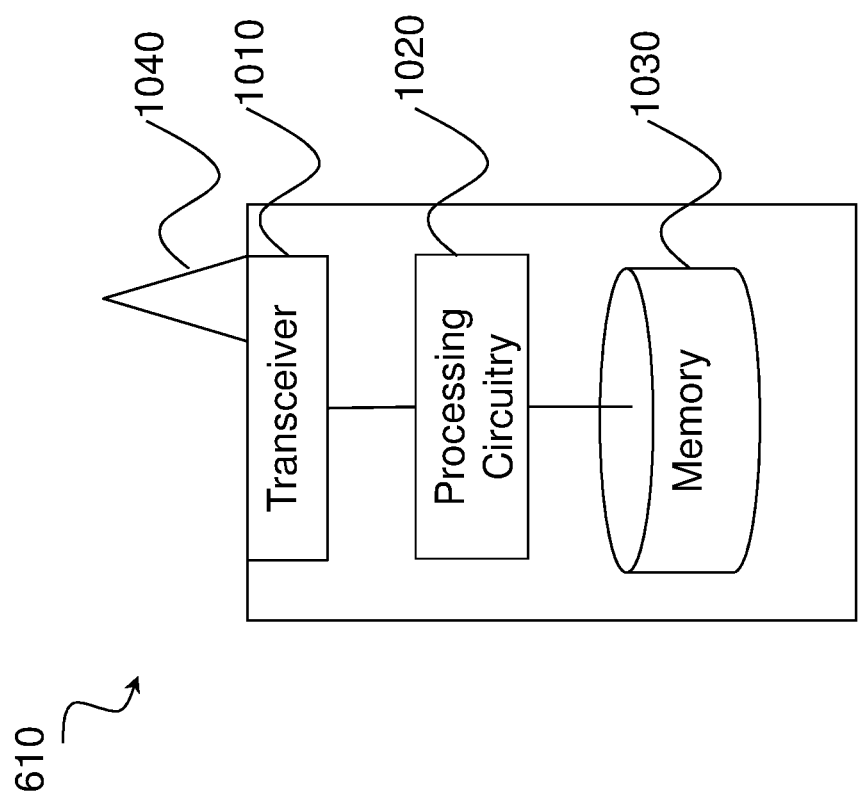
FIG. 10 is a block schematic of an exemplary wireless device, in accordance with certain embodiments.

FIG. 10 is a block schematic of an exemplary wireless device 610, in accordance with certain embodiments. Wireless device 610 may refer to any type of wireless device communicating with a node and/or with another wireless device in a cellular or mobile communication system. Examples of wireless device 610 include a mobile phone, a smart phone, a PDA, a portable computer (e.g., laptop, tablet), a sensor, an actuator, a modem, an MTC device/M2M device, LEE, LME, USB dongles, a D2D capable device, or another device that can provide wireless communication. A wireless device 610 may also be referred to as UE, a station (STA), a device, or a terminal in some embodiments. Wireless device 610 includes transceiver 1010, processing circuitry 1020, and memory 1030. In some embodiments, transceiver 1010 facilitates transmitting wireless signals to and receiving wireless signals from network node 615 (e.g., via antenna 1040), processing circuitry 1020 executes instructions to provide some or all of the functionality described above as being provided by wireless device 610, and memory 1030 stores the instructions executed by processing circuitry 1020.

Processing circuitry 1020 may include any suitable combination of hardware and software implemented in one or more modules to execute instructions and manipulate data to perform some or all of the described functions of wireless device 610, such as the functions of wireless device 610 described above in relation to FIGS. 1-9. In some embodiments, processing circuitry 1020 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1030 is generally operable to store instructions, such as a computer program, software, an application including one or more of logic, rules, algorithms, code, tables, etc. and/or other instructions capable of being executed by processing circuitry 1020. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 1020.

Other embodiments of wireless device 610 may include additional components beyond those shown in FIG. 10 that may be responsible for providing certain aspects of the wireless device's functionality, including any of the functionality described above and/or any additional functionality (including any functionality necessary to support the solution described above). As just one example, wireless device 610 may include input devices and circuits, output devices, and one or more synchronization units or circuits, which may be part of the processing circuitry 1020. Input devices include mechanisms for entry of data into wireless device 610. For example, input devices may include input mechanisms, such as a microphone, input elements, a display, etc. Output devices may include mechanisms for outputting data in audio, video and/or hard copy format. For example, output devices may include a speaker, a display, etc.

Figure 11:
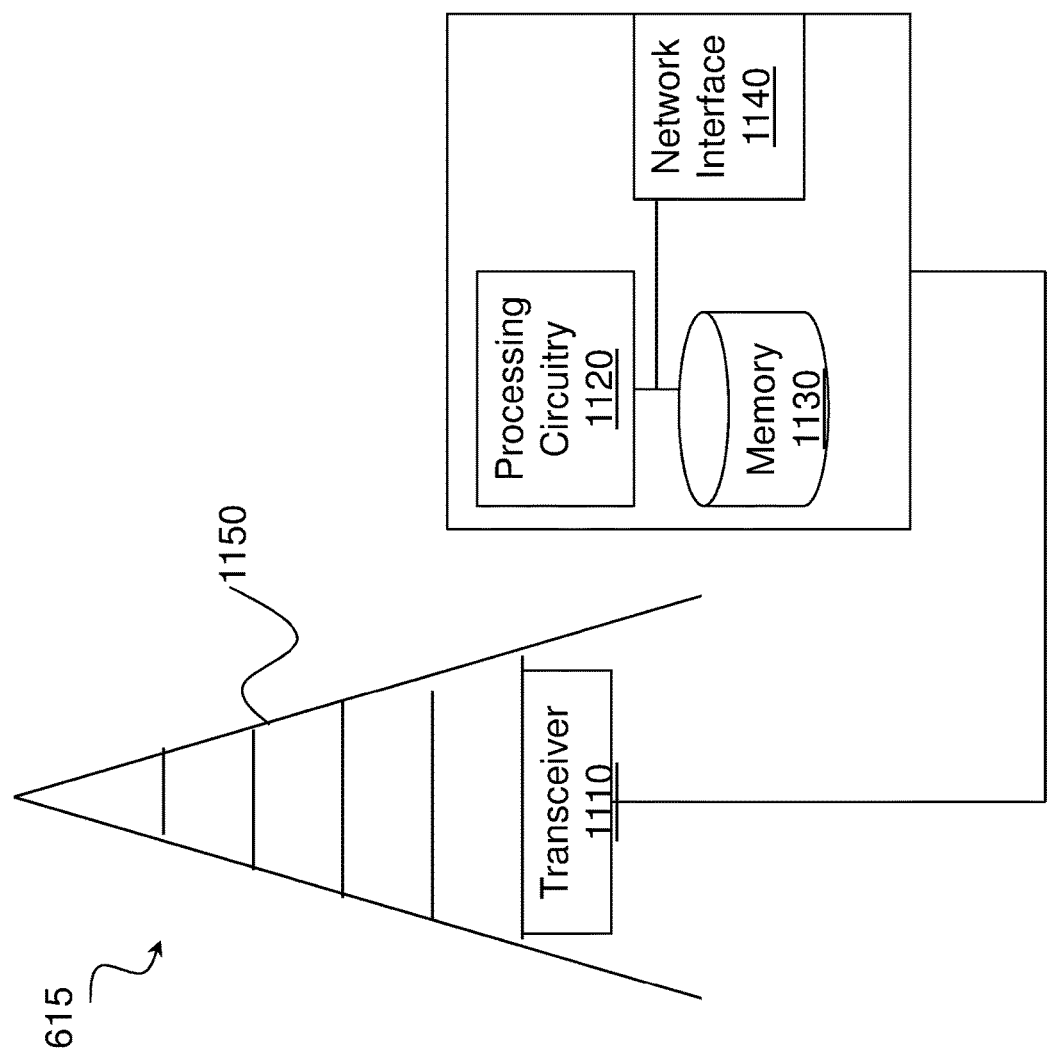
FIG. 11 is a block schematic of an exemplary network node, in accordance with certain embodiments.

FIG. 11 is a block schematic of an exemplary network node 615, in accordance with certain embodiments. Network node 615 may be any type of radio network node or any network node that communicates with a UE and/or with another network node. Examples of network node 615 include an eNB, a node B, a BS, a wireless AP (e.g., a Wi-Fi AP), a low power node, a BTS, relay, donor node controlling relay, transmission points, transmission nodes, RRU, RRH, MSR radio node such as MSR BS, nodes in DAS, O&M, OSS, SON, positioning node (e.g., E-SMLC), MDT, or any other suitable network node. Network nodes 815 may be deployed throughout a network as a homogenous deployment, heterogeneous deployment, or mixed deployment. A homogeneous deployment may generally describe a deployment made up of the same (or similar) type of network nodes 815 and/or similar coverage and cell sizes and inter-site distances. A heterogeneous deployment may generally describe deployments using a variety of types of network nodes 815 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 615 may include one or more of transceiver 1110, processing circuitry 1120, memory 1130, and network interface 1140. In some embodiments, transceiver 1110 facilitates transmitting wireless signals to and receiving wireless signals from wireless device 610 (e.g., via antenna 1150), processing circuitry 1120 executes instructions to provide some or all of the functionality described above as being provided by a network node 615, memory 1130 stores the instructions executed by processing circuitry 1120, and network interface 1140 communicates signals to backend network components, such as a gateway, switch, router, Internet, Public Switched Telephone Network (PSTN), core network nodes or radio network controllers 130, etc.

Processing circuitry 1120 may include any suitable combination of hardware and software implemented in one or more modules to execute instructions and manipulate data to perform some or all of the described functions of network node 615, such as those described above in relation to FIGS. 1-9. In some embodiments, processing circuitry 1120 may include, for example, one or more computers, one or more CPUs, one or more microprocessors, one or more applications, one or more ASICs, one or more FPGAs, and/or other logic.

Memory 1130 is generally operable to store instructions, such as a computer program, software, an application including one or more of logic, rules, algorithms, code, tables, etc. and/or other instructions capable of being executed by processing circuitry 1120. Examples of memory 1130 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1140 is communicatively coupled to processing circuitry 1120 and may refer to any suitable device operable to receive input for network node 615, send output from network node 615, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of network node 615 may include additional components beyond those shown in FIG. 11 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 12:
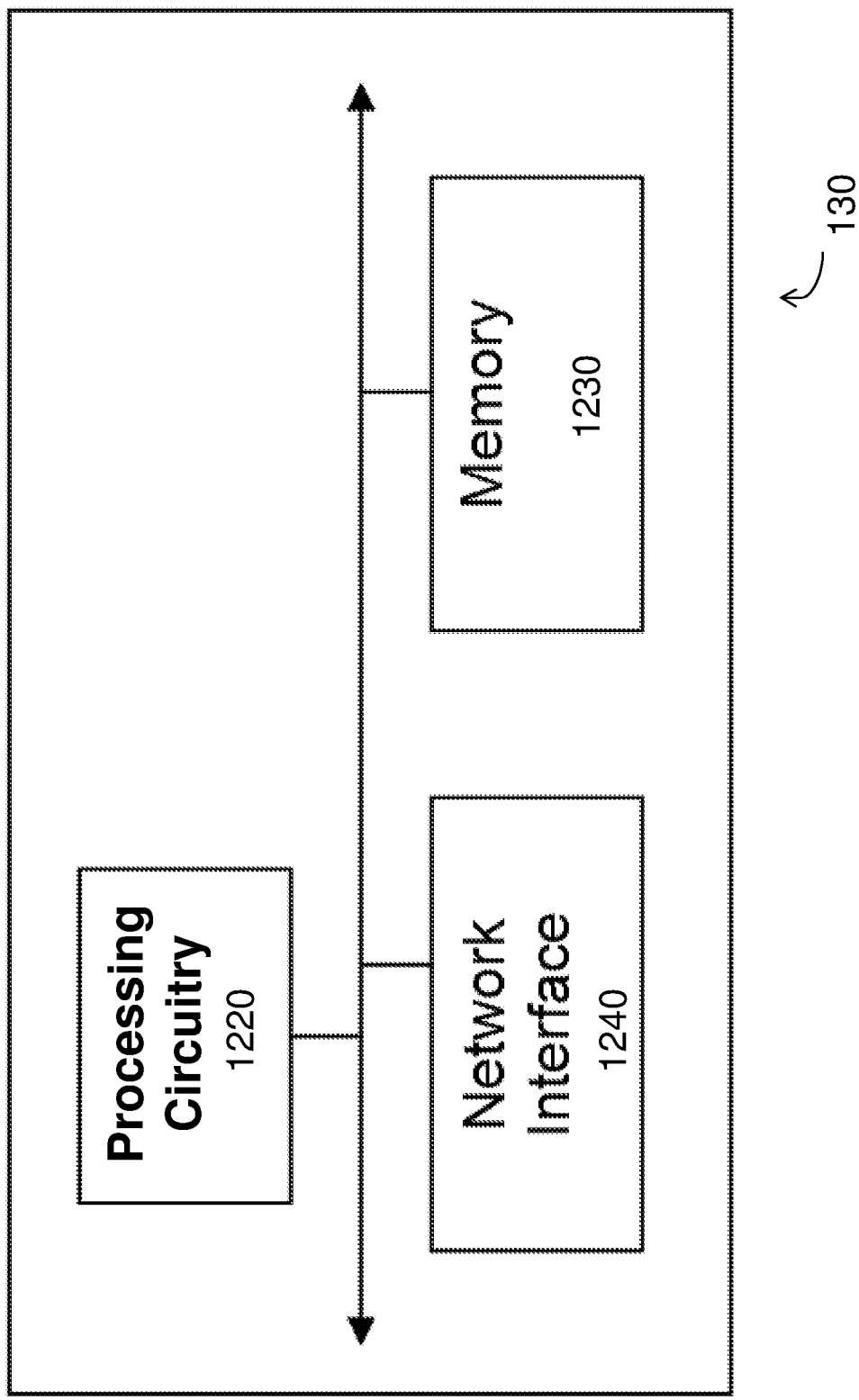
FIG. 12 is a block schematic of an exemplary radio network controller or core network node, in accordance with certain embodiments.

FIG. 12 is a block schematic of an exemplary RNC or core network node 130, in accordance with certain embodiments. Examples of network nodes can include a MSC, a serving GPRS support node (SGSN), an MME, an RNC, a BSC, and so on. The RNC or core network node 130 includes processing circuitry 1220, memory 1230, and network interface 1240. In some embodiments, processing circuitry 1220 executes instructions to provide some or all of the functionality described above as being provided by the network node, memory 1230 stores the instructions executed by processing circuitry 1220, and network interface 1240 communicates signals to any suitable node, such as a gateway, switch, router, Internet, PSTN, network nodes 815, RNCs or core network nodes 130, etc.

Processing circuitry 1220 may include any suitable combination of hardware and software implemented in one or more modules to execute instructions and manipulate data to perform some or all of the described functions of the radio network controller or core network node 130. In some embodiments, processing circuitry 1220 may include, for example, one or more computers, one or more CPUs, one or more microprocessors, one or more applications, one or more ASICs, one or more FPGAs and/or other logic.

Memory 1230 is generally operable to store instructions, such as a computer program, software, an application including one or more of logic, rules, algorithms, code, tables, etc. and/or other instructions capable of being executed by processing circuitry 1220. Examples of memory 1230 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1240 is communicatively coupled to processing circuitry 1220 and may refer to any suitable device operable to receive input for the network node, send output from the network node, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of the network node may include additional components beyond those shown in FIG. 12 that may be responsible for providing certain aspects of the network node's functionality, including any of the functionality described above and/or any additional functionality (including any functionality necessary to support the solution described above).

Figure 13:
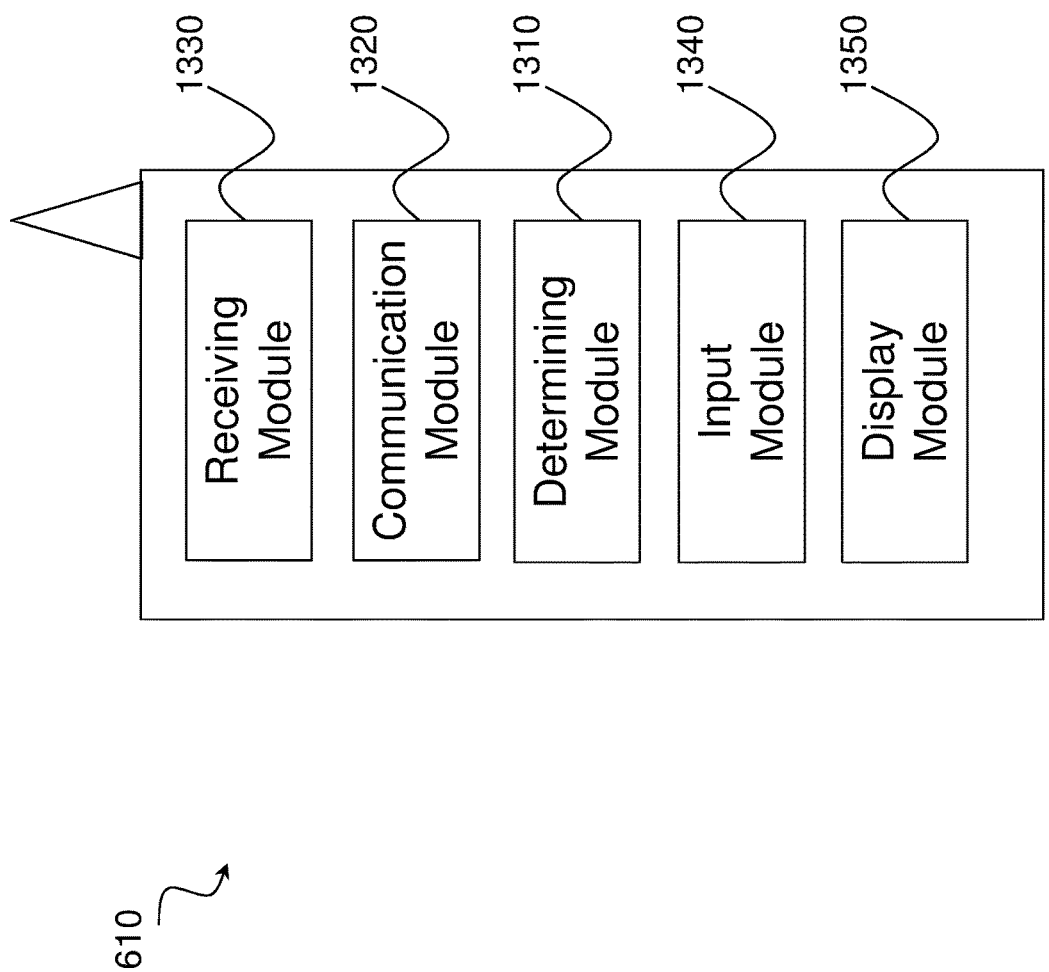
FIG. 13 is a block schematic of an exemplary wireless device, in accordance with certain embodiments.

FIG. 13 is a schematic block diagram of an exemplary wireless device, in accordance with certain embodiments. Wireless device 610 may include one or more modules. For example, wireless device 610 may include a determining module 1310, a communication module 1320, a receiving module 1330, an input module 1340, a display module 1350, and any other suitable modules. In some embodiments, one or more of determining module 1310, communication module 1320, receiving module 1330, input module 1340, display module 1350, or any other suitable module may be implemented using one or more processors, such as processing circuitry 1020 described above in relation to FIG. 10. In certain embodiments, the functions of two or more of the various modules may be combined into a single module. In certain embodiments, wireless device 610 may not include all of the modules described in the example embodiment of FIG. 13 (e.g., wireless device 110 may not include input module 1340 and display module 1350). Wireless device 610 may perform the methods for optimizing network demodulation performance described above in relation to FIGS. 1-9.

Determining module 1310 may perform the processing functions of wireless device 610. In certain embodiments, wireless device 610 may perform the functions of the first node described above in relation to FIGS. 1-9. In such a scenario, determining module 1310 may determine a time resource over which the first node transmits a signal (e.g., a radio signal) to a second node. As another example, determining module 1310 may determine the one or more transient time parameters associated with the time resource based on one or more of: a duration of the time resource; a numerology of the signal to be transmitted by the first node; a type of signal to be transmitted by the first node in the time resource; a frequency band of the signal to be transmitted by the first node; a radio frequency filter implementation in the first node; and an amount of available resources in the first node for transmitting signals. As still another example, determining module 1310 may determine one or more transient time parameters associated with the time resource (the one or more transient time parameters may be used by the first node for transmitting the signal to the second node during the time resource). As yet another example, determining module 1310 may adapt a transmitter configuration of the first node for transmitting the signal to the second node based on one of the one or more transient time parameters. As another example, determining module 1310 may adapt the transmitter configuration such that an ON/OFF behavior of the first network node in the time resource meets one or more pre-defined requirements. As another example, determining module 1310 may adapt the transmitter configuration such that the signal is transmitted according to one of the one or more transient time parameters In certain embodiments, wireless device 610 may perform the functions of the second node described above in relation to FIGS. 1-9. In such a scenario, determining module 1310 may select one of the plurality of transient time parameters with which to configure the first node. As another example, determining module 1310 may configure the first node with the selected one of the plurality of transient time parameters. As still another example, determining module 1310 may adapt a receiver configuration of the second node based on the selected one of the plurality of transient time parameters. As yet another example, determining module 1310 may demodulate the received signal (e.g., radio signal) using the selected transient time parameter by removing one or more signal samples received from the first node during a transient time period associated with the selected one of the plurality of transient time parameters.

Determining module 1310 may include or be included in one or more processors, such as processing circuitry 1020 described above in relation to FIG. 10. Determining module 1310 may include analog and/or digital circuitry configured to perform any of the functions of determining module 1310 and/or processing circuitry 1020 described above. The functions of determining module 1310 described above may, in certain embodiments, be performed in one or more distinct modules.

Communication module 1320 may perform the transmission functions of wireless device 610. In certain embodiments, wireless device 610 may perform the functions of the first node described above in relation to FIGS. 1-9. In such a scenario, communication module 1320 may signal, to at least one of the second node or a third node, information about one or more transient time parameters associated with the time resource, wherein the one or more transient time parameters are used by the first node for transmitting the signal to the second node during the time resource. As another example, communication module 1320 may transmit the signal to the second node using the adapted transmitter configuration.

In certain embodiments, wireless device 610 may perform the functions of the second node described above in relation to FIGS. 1-9. In such a scenario, communication module 1320 may configure the first node with the selected one of the plurality of transient time parameters (e.g., by sending a configuration to the first node).

In certain embodiments, wireless device 610 may perform the functions of the third node described above in relation to FIGS. 1-9. In such a scenario, communication module 1320 may transmit the received information about the at least one transient time parameter to the second node.

Communication module 1320 may include a transmitter and/or a transceiver, such as transceiver 1010 described above in relation to FIG. 10. Communication module 1320 may include circuitry configured to wirelessly transmit messages and/or signals. In particular embodiments, communication module 1320 may receive messages and/or signals for transmission from determining module 1310. In certain embodiments, the functions of communication module 1320 described above may be performed in one or more distinct modules.

Receiving module 1330 may perform the receiving functions of wireless device 610. In certain embodiments, wireless device 610 may perform the functions of the first node described above in relation to FIGS. 1-9. In such a scenario, receiving module 1330 may receive the time resource from another node. As another example, receiving module 1330 may receive, from at least one of the second node and the third node, a configuration requesting the first node to apply one of the at least two transient time parameters for transmitting the signal to the second node.

In certain embodiments, wireless device 610 may perform the functions of the second node described above in relation to FIGS. 1-9. In such a scenario, receiving module 1330 may receive, from one or more of a first node and a third node, information about at least one transient time parameter supported by the first node for transmitting a signal over a time resource to the second node. As another example, receiving module 1330 may receive, from the first node, the signal over the time resource based on the at least one transient time parameter. As still another example, receiving module 1330 may receive information about a plurality of transient time parameters supported by the first node for transmitting the signal over the time resource to the second node In certain embodiments, wireless device 610 may perform the functions of the third node described above in relation to FIGS. 1-9. In such a scenario, receiving module 1330 may receive, from a first node, information about at least one transient time parameter supported by the first node for transmitting a signal over a time resource to a second node.

Receiving module 1330 may include a receiver and/or a transceiver. Receiving module 1330 may include a receiver and/or a transceiver, such as transceiver 1010 described above in relation to FIG. 10. Receiving module 1330 may include circuitry configured to wirelessly receive messages and/or signals. In particular embodiments, receiving module 1330 may communicate received messages and/or signals to determining module 1310. The functions of receiving module 1330 described above may, in certain embodiments, be performed in one or more distinct modules.

Input module 1340 may receive user input intended for wireless device 610. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1310. The functions of input module 1340 described above may, in certain embodiments, be performed in one or more distinct modules.

Display module 1350 may present signals on a display of wireless device 610. Display module 1350 may include the display and/or any appropriate circuitry and hardware configured to present signals on the display. Display module 1350 may receive signals to present on the display from determining module 1310. The functions of display module 1350 described above may, in certain embodiments, be performed in one or more distinct modules.

Determining module 1310, communication module 1320, receiving module 1330, input module 1340, and display module 1350 may include any suitable configuration of hardware and/or software. Wireless device 610 may include additional modules beyond those shown in FIG. 13 that may be responsible for providing any suitable functionality, including any of the functionality described above and/or any additional functionality (including any functionality necessary to support the various solutions described herein).

Figure 14:
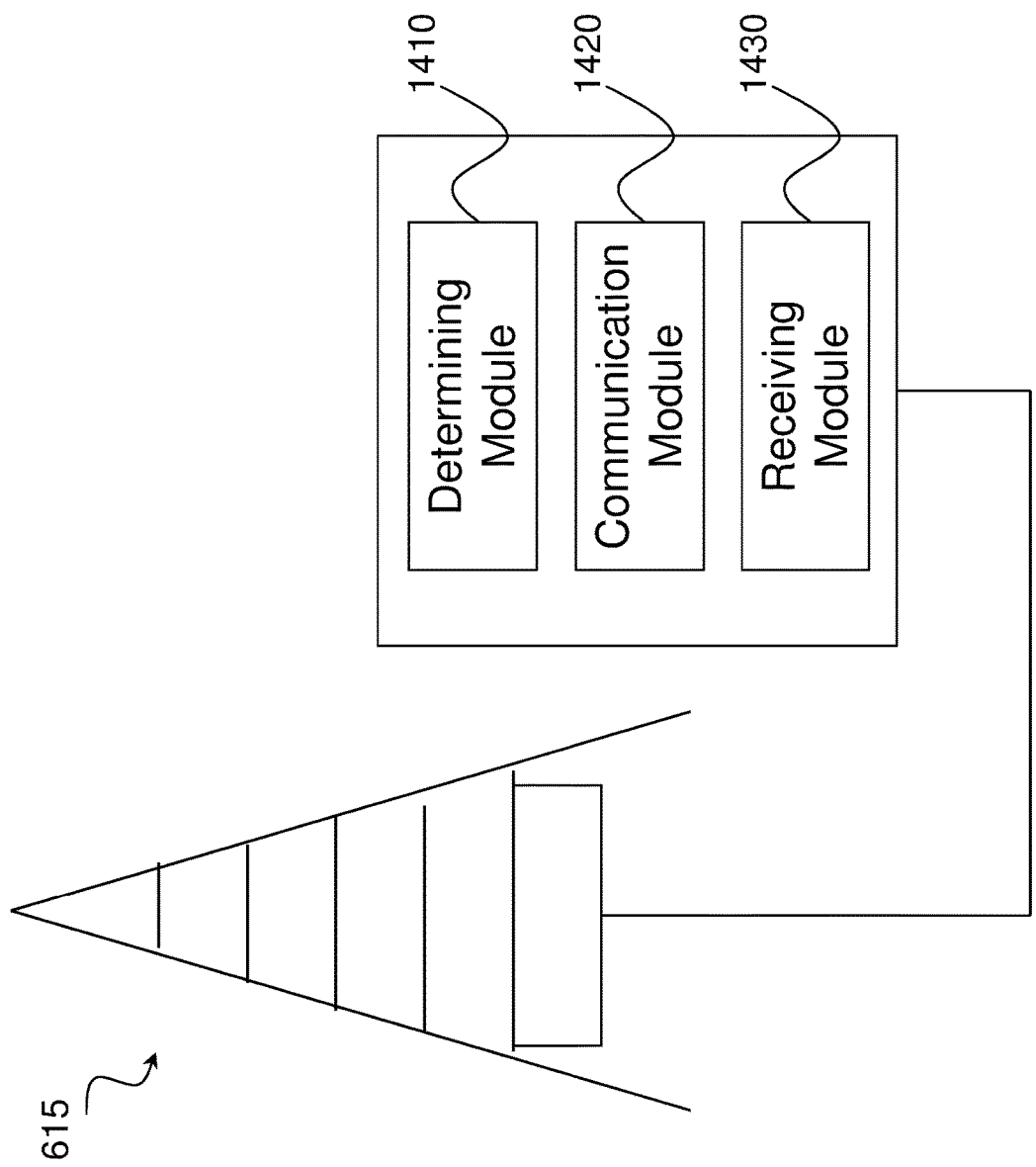
FIG. 14 is a block schematic of an exemplary network node, in accordance with certain embodiments.

FIG. 14 is a schematic block diagram of an exemplary network node 615, in accordance with certain embodiments. Network node 615 may include one or more modules. For example, network node 615 may include determining module 1410, communication module 1420, receiving module 1430, and any other suitable modules. In some embodiments, one or more of determining module 1410, communication module 1420, receiving module 1430, or any other suitable module may be implemented using one or more processors, such as processing circuitry 1120 described above in relation to FIG. 11. In certain embodiments, the functions of two or more of the various modules may be combined into a single module. In certain embodiments, network node 615 may not include all of the modules described in the example embodiment of FIG. 14. Network node 615 may perform the methods for optimizing network demodulation performance described above in relation to FIGS. 1-9.

Determining module 1410 may perform the processing functions of network node 615. In certain embodiments, network node 615 may perform the functions of the first node described above in relation to FIGS. 1-9. In such a scenario, determining module 1410 may determine a time resource over which the first node transmits a signal (e.g., a radio signal) to a second node. As another example, determining module 1410 may determine the one or more transient time parameters associated with the time resource based on one or more of: a duration of the time resource; a numerology of the signal to be transmitted by the first node; a type of signal to be transmitted by the first node in the time resource; a frequency band of the signal to be transmitted by the first node; a radio frequency filter implementation in the first node; and an amount of available resources in the first node for transmitting signals. As still another example, determining module 1410 may determine one or more transient time parameters associated with the time resource (the one or more transient time parameters may be used by the first node for transmitting the signal to the second node during the time resource). As yet another example, determining module 1410 may adapt a transmitter configuration of the first node for transmitting the signal to the second node based on one of the one or more transient time parameters. As another example, determining module 1410 may adapt the transmitter configuration such that an ON/OFF behavior of the first network node in the time resource meets one or more pre-defined requirements. As another example, determining module 1410 may adapt the transmitter configuration such that the signal is transmitted according to one of the one or more transient time parameters In certain embodiments, network node 615 may perform the functions of the second node described above in relation to FIGS. 1-9. In such a scenario, determining module 1410 may select one of the plurality of transient time parameters with which to configure the first node. As another example, determining module 1410 may configure the first node with the selected one of the plurality of transient time parameters. As still another example, determining module 1410 may adapt a receiver configuration of the second node based on the selected one of the plurality of transient time parameters. As yet another example, determining module 1410 may demodulate the received signal (e.g., radio signal) using the selected transient time parameter by removing one or more signal samples received from the first node during a transient time period associated with the selected one of the plurality of transient time parameters.

Determining module 1410 may include or be included in one or more processors, such as processing circuitry 1120 described above in relation to FIG. 11. Determining module 1410 may include analog and/or digital circuitry configured to perform any of the functions of determining module 1410 and/or processing circuitry 1120 described above. The functions of determining module 1410 may, in certain embodiments, be performed in one or more distinct modules.

Communication module 1420 may perform the transmission functions of network node 615. In certain embodiments, network node 615 may perform the functions of the first node described above in relation to FIGS. 1-9. In such a scenario, communication module 1420 may signal, to at least one of the second node or a third node, information about one or more transient time parameters associated with the time resource, wherein the one or more transient time parameters are used by the first node for transmitting the signal to the second node during the time resource. As another example, communication module 1420 may transmit the signal to the second node using the adapted transmitter configuration.

In certain embodiments, network node 615 may perform the functions of the second node described above in relation to FIGS. 1-9. In such a scenario, communication module 1420 may configure the first node with the selected one of the plurality of transient time parameters (e.g., by sending a configuration to the first node).

In certain embodiments, network node 615 may perform the functions of the third node described above in relation to FIGS. 1-9. In such a scenario, communication module 1420 may transmit the received information about the at least one transient time parameter to the second node.

Communication module 1420 may transmit messages to one or more of wireless devices 810. Communication module 1420 may include a transmitter and/or a transceiver, such as transceiver 1110 described above in relation to FIG. 11. Communication module 1420 may include circuitry configured to wirelessly transmit messages and/or signals. In particular embodiments, communication module 1420 may receive messages and/or signals for transmission from determining module 1410 or any other module. The functions of communication module 1420 may, in certain embodiments, be performed in one or more distinct modules.

Receiving module 1430 may perform the receiving functions of network node 615. In certain embodiments, network node 615 may perform the functions of the first node described above in relation to FIGS. 1-9. In such a scenario, receiving module 1430 may receive the time resource from another node. As another example, receiving module 1430 may receive, from at least one of the second node and the third node, a configuration requesting the first node to apply one of the at least two transient time parameters for transmitting the signal to the second node.

In certain embodiments, network node 615 may perform the functions of the second node described above in relation to FIGS. 1-9. In such a scenario, receiving module 1430 may receive, from one or more of a first node and a third node, information about at least one transient time parameter supported by the first node for transmitting a signal over a time resource to the second node. As another example, receiving module 1430 may receive, from the first node, the signal over the time resource based on the at least one transient time parameter. As still another example, receiving module 1430 may receive information about a plurality of transient time parameters supported by the first node for transmitting the signal over the time resource to the second node In certain embodiments, network node 615 may perform the functions of the third node described above in relation to FIGS. 1-9. In such a scenario, receiving module 1430 may receive, from a first node, information about at least one transient time parameter supported by the first node for transmitting a signal over a time resource to a second node.

Receiving module 1430 may receive any suitable information from a wireless device or another network node. Receiving module 1430 may include a receiver and/or a transceiver, such as transceiver 1110 described above in relation to FIG. 11. Receiving module 1430 may include circuitry configured to wirelessly receive messages and/or signals. In particular embodiments, receiving module 1430 may communicate received messages and/or signals to determining module 1410 or any other suitable module. The functions of receiving module 1430 may, in certain embodiments, be performed in one or more distinct modules.

Determining module 1410, communication module 1420, and receiving module 1430 may include any suitable configuration of hardware and/or software. Network node 615 may include additional modules beyond those shown in FIG. 14 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Abbreviations Used in the Preceding Description Include

3GPP Third Generation Partnership Project
ACK Acknowledgement
AP Access Point
ASIC Application Specific Integrated Circuit
BLER Block Error Rate
BS Base Station
BSC Base Station Controller
BTS Base Transceiver Station
CD Compact Disk
CFI Control Format Indicator
CGI Cell Global Identity
CPE Customer Premises Equipment
CPU Central Processing Unit
CSI Channel State Information
CSI-RS Channel State Information Reference Signal
CRS Common Reference Symbols
D2D Device-to-device
DAS Distributed Antenna System
DFT Discrete Fourier Transform
DL Downlink
DMRS Demodulation Reference Signal
DVD Digital Video Disk
eNB evolved Node B
E-PDCCH Enhanced Physical Downlink Control Channel
E-SMLC Evolved-Serving Mobile Location Center
FDD Frequency Division Duplex
FPGA Field Programmable Gate Array
FS Frame Structure
gNB gNodeB
GPRS General Packet Radio Service
HARQ Hybrid Automatic Repeat Request
HTTP Hypertext Transfer Protocol
LAN Local Area Network
LEE Laptop Embedded Equipment
LME Laptop Mounted Equipment
LTE Long Term Evolution
M2M Machine-to-Machine
MAN Metropolitan Area Network
MB SFN RS Multicast-Broadcast Single-Frequency Network Reference Signal
MCE Multi-cell/multicast Coordination Entity
MCS Modulation level and coding scheme
MDT Minimization of Drive Test
MeNB Master eNB
MME Mobility Management Entity
MPDCCH Category M Physical Downlink Control Channel
MSC Mobile Switching Center
MSR Multi-Standard Radio
MTC Machine-Type Communication
NACK Negative Acknowledgement
NAS Non-Access Stratum
NB-IoT Narrowband Internet-of-Things
NPBCH Narrowband Physical Broadcast Channel
NPDCCH Narrowband Physical Downlink Control Channel
NPDSCH Narrowband Physical Downlink Shared Channel
NPRACH Narrowband Physical Random Access Channel
NPSS Narrowband Primary Synchronization Signal
NPUSCH Narrowband Physical Uplink Shared Channel
NR New Radio
NRS Narrowband Reference Signal
NSSS Narrowband Secondary Synchronization Signal
OFDM Orthogonal Frequency Division Multiplexing
O&M Operations & Management
OSS Operations Support System
PBCH Physical Broadcast Channel
PCell Primary Cell
PCFICH Physical Control Format Indicator Channel
PDCCH Physical Downlink Control Channel
PDSCH Physical Downlink Shared Channel
PHICH Physical HARQ Indication Channel
PRACH Physical Random Access Channel
PRB Physical Resource Block
PRS Positioning Reference Signal
PSS Primary Synchronization Signal
PSTN Public Switched Telephone Network
PUSCH Physical Uplink Shared Channel
PUCCH Physical Uplink Control Channel
RACH Random Access Channel
RAM Random Access Memory
RAN Radio Access Network
RAT Radio Access Technology
RB Resource Block
RNC Radio Network Controller
ROM Read-Only Memory
RRC Radio Resource Control
RRH Remote Radio Head
RRM Radio Resource Management
RRU Remote Radio Unit
RSRP Reference Signal Received Power
RSRQ Reference Signal Received Quality
SCell Secondary Cell
SC-FDMA Single-Carrier Frequency Division Multiple Access SeNB Secondary eNB
SGSN Serving GPRS Support Node
SON Self-Organizing Network
sPUCCH Short Physical Uplink Control Channel
sPDSCH Short Physical Downlink Shared Channel
sPUSCH Short Physical Uplink Shared Channel
SRS Sounding Reference Signal
SS Synchronization Signal
SSF Short Subframe
SSS Secondary Synchronization Signal
STA Station
sTTI Short Transmission Time Interval
TCP Transmission Control Protocol
TDD Time Division Duplex
TR Time Resource
TT Transient Time Parameter
TTI Transmission Time Interval
UE User Equipment
UL Uplink
WAN Wide Area Network

The invention claimed is:

1. A method in a first node comprising:
determining a time resource over which the first node transmits a signal to a second node;
signaling, to at least one of the second node or a third node, in response to a request, information about one or more transient time parameters associated with the time resource, wherein the one or more transient time parameters are used by the first node for transmitting the signal to the second node during the time resource; and
adapting a transmitter configuration of the first node for transmitting the signal to the second node based on one of the one or more transient time parameters.

2. A method in a second node, comprising:
receiving, from one or more of a first node and a third node, in response to a request from the second node, information about at least one transient time parameter supported by the first node for transmitting a signal over a time resource to the second node; and
receiving, from the first node, the signal over the time resource based on the at least one transient time parameter.

3. A first node comprising:
a receiver;
a transmitter; and
processing circuitry coupled to the receiver and the transmitter, the processing circuitry configured to:
determine a time resource over which the first node transmits a signal to a second node;
signal, via the transmitter to at least one of the second node or a third node, in response to a request, information about one or more transient time parameters associated with the time resource, wherein the one or more transient time parameters are used by the first node for transmitting the signal to the second node during the time resource; and
adapt a transmitter configuration of the first node for transmitting the signal to the second node based on one of the one or more transient time parameters.

4. The first node of claim 3, wherein the processing circuitry is configured to transmit, via the transmitter, the signal to the second node using the adapted transmitter configuration.

5. The first node of claim 3, wherein the processing circuitry configured to determine the time resource over which the first node transmits the signal to the second node comprises processing circuitry configured to perform one or more of:
determine the time resource based on one or more pre-defined rules; and
receive, via the receiver, the time resource from another node.

6. The first node of claim 3, wherein the processing circuitry is configured to determine the time resource over which the first node transmits the signal to the second node based on one or more of:
pre-defined information;
a configuration received from another node; and
one or more transmission time intervals supported by the first node.

7. The first node of claim 3, wherein the one or more transient time parameters consist of a single transient time parameter associated with the time resource.

8. The first node of claim 3, wherein the one or more transient time parameters comprise at least two transient time parameters associated with the time resource.

9. The first node of claim 8, wherein the processing circuitry is configured to:
receiving, via the receiver from at least one of the second node and the third node, a configuration requesting the first node to apply one of the at least two transient time parameters for transmitting the signal to the second node.

10. The first node of claim 3, wherein the one or more transient time parameters define at least a time period between any two points in time over which the first node changes its transmit power.

11. The first node of claim 3, wherein the processing circuitry is configured to determine the one or more transient time parameters associated with the time resource based on one or more of:
a duration of the time resource;
a numerology of the signal to be transmitted by the first node;
a type of signal to be transmitted by the first node in the time resource;
a frequency band of the signal to be transmitted by the first node;
a radio frequency filter implementation in the first node; and
an amount of available resources in the first node for transmitting signals.

12. The first node of claim 3, wherein the information about the one or more transient time parameters comprises one or more of:
a duration of a corresponding transient time;
an identifier of one of a plurality of transient times associated with the time resource; and
an identifier of the time resource associated with the one or more transient time parameters.

13. The first node of claim 3, wherein the processing circuitry configured to adapt the transmitter configuration of the first node for transmitting the signal to the second node based on one of the one or more transient time parameters comprises processing circuitry configured to perform one or more of:
adapt the transmitter configuration such that an ON/OFF behavior of the first network node in the time resource meets one or more pre-defined requirements; and adapt the transmitter configuration such that the signal is transmitted according to one of the one or more transient time parameters.

14. The first node of claim 3, wherein the first node is a wireless device and the second node is a network node.

15. The first node of claim 3, wherein the first node is a network node and the second node is a wireless device.

16. A second node, comprising:
a receiver;
a transmitter; and
processing circuitry coupled to the receiver and the transmitter, the processing circuitry configured to:
receive, via the receiver from one or more of a first node and a third node, in response to a request sent by the second node, information about at least one transient time parameter supported by the first node for transmitting a signal over a time resource to the second node; and
receive, via the receiver from the first node, the signal over the time resource based on the at least one transient time parameter.

17. The second node of claim 16, wherein the processing circuitry configured to receive the information about the at least one transient time parameter comprises processing circuitry configured to receive, via the receiver, information about a plurality of transient time parameters supported by the first node for transmitting the signal over the time resource to the second node.

18. The second node of claim 17, wherein the processing circuitry is configured to:
select one of the plurality of transient time parameters with which to configure the first node; and
configure the first node with the selected one of the plurality of transient time parameters.

19. The second node of claim 18, wherein the processing circuitry is configured to select one of the plurality of transient time parameters with which to configure the first node based on at least one of:
a receiver capability of the second node; and
a transport format of the signal transmitted by the first node.

20. The second node of claim 18, wherein the processing circuitry is configured to:
adapt a receiver configuration of the second node based on the selected one of the plurality of transient time parameters.

21. The second node of claim 20, wherein the processing circuitry configured to adapt the receiver configuration comprises processing circuitry configured to:
demodulate the received signal using the selected transient time parameter by removing one or more signal samples received from the first node during a transient time period associated with the selected one of the plurality of transient time parameters.

22. The second node of claim 16, wherein:
the first node is a wireless device and the second node is a network node.

23. The second node of claim 16, wherein:
the first node is a network node and the second node is a wireless device.

24. The second node of claim 16, wherein the information about the one or more transient time parameters comprises one or more of:
a duration of a corresponding transient time;
an identifier of one of a plurality of transient times associated with the time resource; and
an identifier of the time resource associated with the one or more transient time parameters.

* * * * *